(12) United States Patent  
Minami

(10) Patent No.: US 8,621,256 B2  
(45) Date of Patent: Dec. 31, 2013

(54) SIGNAL PROCESSING DEVICE, SIGNAL PROCESSING METHOD, AND PROGRAM

(75) Inventor: Yosihiro Minami, Kanagawa (JP)

(73) Assignee: Sony Corporation, Tokyo (JP)

( * ) Notice: Subject to any disclaimer, the term of this patent is extended or adjusted under 35 U.S.C. 154(b) by 1004 days.

(21) Appl. No.: 12/644,793

(22) Filed: Dec. 22, 2009

(65) Prior Publication Data

US 2010/0169620 A1 Jul. 1, 2010

(30) Foreign Application Priority Data

Dec. 26, 2008 (JP) ................................ 2008-334989

(51) Int. Cl.
*G06F 1/00* (2006.01)

(52) U.S. Cl.
USPC .............................. 713/324; 713/322; 326/21

(58) Field of Classification Search
USPC ............................. 713/322, 326, 324; 326/21
See application file for complete search history.

(56) References Cited

U.S. PATENT DOCUMENTS

| 6,910,165 | B2* | 6/2005 | Chen et al. ..................... 714/739 |
| 8,019,382 | B2* | 9/2011 | Rush et al. ................. 455/553.1 |
| 8,116,540 | B2* | 2/2012 | Dean et al. ..................... 382/124 |
| 2006/0063495 | A1* | 3/2006 | Hamilton ..................... 455/90.3 |
| 2007/0076116 | A1* | 4/2007 | Pandit et al. ................... 348/364 |
| 2008/0106153 | A1* | 5/2008 | Aoyama et al. ............... 307/147 |
| 2012/0148122 | A1* | 6/2012 | Dean et al. ..................... 382/124 |

FOREIGN PATENT DOCUMENTS

| JP | 05-120248 |   | 5/1993 |
| JP | 10-269351 |   | 10/1998 |
| JP | 2003-153070 | A | 5/2003 |
| JP | 2004-266467 | A | 9/2004 |
| JP | 2006-080646 | A | 3/2006 |
| JP | 2006-243864 | A | 9/2006 |
| JP | 2007-036425 | A | 2/2007 |
| JP | 2007-096633 | A | 4/2007 |

* cited by examiner

*Primary Examiner* — Jaweed A Abbaszadeh

(74) *Attorney, Agent, or Firm* — Wolf, Greenfield & Sacks, P.C.

(57) ABSTRACT

There is provided a signal processing device which is capable of suppressing the influence of a digital data process on an analog signal process without completely stopping a digital data processing circuit. A signal processing device includes an analog signal processing circuit, a digital data processing circuit, a determination section configured to determine an influence of the digital data processing circuit on the analog signal processing circuit, and a control section configured to stop a partial circuit of the digital data processing circuit or lower processing capability thereof in response to a determination result of the determination section.

14 Claims, 16 Drawing Sheets

SIGNAL PROCESSING DEVICE, SIGNAL PROCESSING METHOD, AND PROGRAM

CROSS REFERENCE TO RELATED APPLICATIONS

The present application claims priority under 35 U.S.C. §119 to Japanese Patent Application No. JP 2008-334989, filed in the Japan Patent Office on Dec. 26, 2008, the entire contents of which are incorporated herein by reference.

BACKGROUND OF THE INVENTION

1. Field of the Invention

The present invention relates to a signal processing device having an analog signal processing circuit and a digital data processing circuit, a signal processing method, and a program.

2. Description of the Related Art

When a signal processing device has an analog signal processing circuit and a digital data processing circuit, the digital data processing circuit may influence the analog signal processing circuit.

For example, in the case where the digital data processing circuit operates when the analog signal processing circuit is in operation, digital noise may be mixed into an analog signal.

In addition, for example, an image capturing device includes an analog circuit having an image capturing element and a digital data processing circuit. When the digital data processing circuit operates and a temperature increases in the image capturing device, a dark current of the image capturing element increases. Consequently, a dark current component included in an analog signal of a captured image increases.

As described above, the analog signal processing circuit or the analog circuit is influenced by the digital data processing circuit. The analog signal processing circuit may not process an analog signal by its original performance.

Japanese Unexamined Patent Application Publication No. 2003-153070 discloses an image capturing device. The image capturing device stops a digital data processing circuit when an analog signal processing circuit operates.

The image capturing device of Japanese Unexamined Patent Application Publication No. 2003-153070 prevents digital noise from being mixed into the analog signal by preventing the digital data processing circuit from operating simultaneously when the analog signal processing circuit operates.

Japanese Unexamined Patent Application Publication No. 5-120248 discloses a computer system of a multiprocessor configuration. The computer system uses a plurality of processors to which a high priority has been assigned for an application process.

In the case of a specific operating mode, the computer system disclosed in Japanese Unexamined Patent Application Publication No. 5-120248 changes priorities of some processors of a plurality of processors to the high order by controlling hardware.

The computer system of Japanese Unexamined Patent Application Publication No. 5-120248 improves the efficiency of use of the plurality of processors by changing the priorities of some processors as described above and preferentially processing the application process.

SUMMARY OF THE INVENTION

However, in a method of Japanese Unexamined Patent Application Publication No. 2003-153070, the digital data processing circuit is uniformly and completely stopped when the analog signal processing circuit operates. Consequently, the analog signal processing circuit and the digital data processing circuit operate by time division.

Therefore, for example, when the analog signal processing circuit is speeded up and the digital data processing circuit has a large size and is complicated in a method of Japanese Unexamined Patent Application Publication No. 2003-153070, there is a possibility that the timing of stopping the digital data processing circuit may not be secured.

For example, when a signal processing device captures a moving image or continuously captures a still image, the analog signal processing circuit continuously processes analog signals of a plurality of images continuously captured. In this case, the digital data processing circuit is frequently stopped every time when the analog signal processing circuit operates.

Consequently, the digital data processing circuit may not secure a sufficient processing time and may not implement its processing capability. Furthermore, since a process of digital data of an image processed by the analog signal processing circuit is interrupted, a memory having a vast amount of storage is necessary to temporarily store unprocessed digital data.

Therefore, the method of Japanese Unexamined Patent Application Publication No. 2003-153070 may not be adopted, for example, in a signal processing device used to capture a moving image or a signal processing device for continuously capturing a still image.

In the method of Japanese Unexamined Patent Application Publication No. 5-120248, a plurality of processors are used as actively as possible since a priority is changed. In this case, there is a high possibility that the plurality of processors may be operated by a high load and digital noise may be mixed into an analog signal processing circuit.

Therefore, the method of Japanese Unexamined Patent Application Publication No. 5-120248 may not suppress the influence on an analog signal process due to an operation of the digital data processing circuit.

Furthermore, the method of Japanese Unexamined Patent Application Publication No. 5-120248 preferentially secures a processor to be used by an application according to an operating mode. Therefore, it is necessary for the method of Japanese Unexamined Patent Application Publication No. 5-120248 to predict the load of each processor before the priority is changed so that each processor is not overloaded after the priority is changed.

It is desirable to provide a signal processing device, a signal processing method, and a program, which are capable of suppressing the influence of a digital data process on an analog signal process without completely stopping a digital data processing circuit.

A signal processing device according to an embodiment of the present invention includes an analog signal processing circuit, a digital data processing circuit, a determination section configured to determine an influence of the digital data processing circuit on the analog signal processing circuit, and a control section configured to stop a partial circuit of the digital data processing circuit or lower processing capability thereof in response to a determination result of the determination section.

A signal processing method according to another embodiment of the present invention includes the steps of determining an influence of a digital data processing circuit on an analog signal processing circuit, controlling to stop a partial circuit of the digital data processing circuit or lower processing capability thereof in response to a determination result of the determining step, and operating the analog signal processing circuit and the digital data processing circuit in a state in which the partial circuit has been stopped or the processing capability thereof has been lowered.

A according to a further embodiment of the present invention causing a computer to execute the processes of determining an influence of a digital data processing circuit on an analog signal processing circuit, controlling to stop a partial circuit of the digital data processing circuit or lower processing capability thereof in response to a determination result of the determining process, and operating the analog signal processing circuit and the digital data processing circuit in a state in which the partial circuit has been stopped or the processing capability thereof has been lowered.

A signal processing device according to a still further embodiment of the present invention includes an analog signal processing circuit, a digital data processing circuit, a determination section configured to determine an influence of the digital data processing circuit on the analog signal processing circuit, and a control section configured to raise noise cancelling capability of the analog signal processing circuit or the digital data processing circuit in response to a determination result of the determination section.

According to the above-described first to third embodiments of the present invention, the influence of the digital data processing circuit on the analog signal processing circuit is determined.

For example, the influence on the analog signal processing circuit is the influence on an analog signal to be processed by the analog signal processing circuit or the influence on an analog signal process of the analog signal processing circuit.

According to the above-described first to third embodiments of the present invention, the partial circuit of the digital data processing circuit may be stopped, or the processing capability may be lowered, in response to the determination result of the determination section.

According to the above-described first to third embodiments of the present invention, when it has been determined that the digital data processing circuit influences the analog signal processing circuit, the partial circuit of the digital data processing circuit is in a stop state or in a state in which the processing capability has been lowered.

The analog signal processing circuit and the digital data processing circuit operate in a state in which the processing capability of the partial circuit of the digital data processing circuit has been lowered.

According to the above-described fourth embodiment of the present invention, the influence of the digital data processing circuit on the analog signal processing circuit is determined. In response to the determination result of the determination section, noise cancelling capability by the analog signal processing circuit or the digital data processing circuit is raised.

According to the above-described fourth embodiment of the present invention, in a state in which it is determined that the digital data processing circuit influences the analog signal processing circuit, noise cancelling capability by the analog signal processing circuit or the digital data processing circuit is raised.

According to embodiments of the present invention, the influence of a digital data process on an analog signal process is capable of being suppressed without completely stopping a digital data processing circuit.

DESCRIPTION OF THE PREFERRED EMBODIMENTS

Hereinafter, embodiments of the present invention will be described with reference to the drawings. A description will be provided in the following sequence.

1. A first embodiment (an example of a signal processing device by one device)

2. A second embodiment (an example of a signal processing device by a plurality of devices)

3. A third embodiment (an example of a device for performing a determination using setting information)

4. A fourth embodiment (an example of a signal processing device for performing a determination using setting information)

5. A fifth embodiment (an example of noise cancellation by an analog signal processing circuit)

6. A sixth embodiment (a layout example in which the influence on an analog circuit is difficult to be generated)

7. A seventh embodiment (an example of a camera system)
8. An eighth embodiment (an example of an image recording/reproducing system)

1. First Embodiment

[Configuration of Device]

In the case where an analog signal processing circuit and another circuit exist in one device (integrated circuit), noise may be generated, for example, when the other circuit operates, and an analog signal process may be influenced.

Therefore, in this device, by suppressing the influence of the other circuit on the analog signal process, the original performance of the analog signal process can be implemented and the quality of the analog signal process can be improved.

Figure 1:
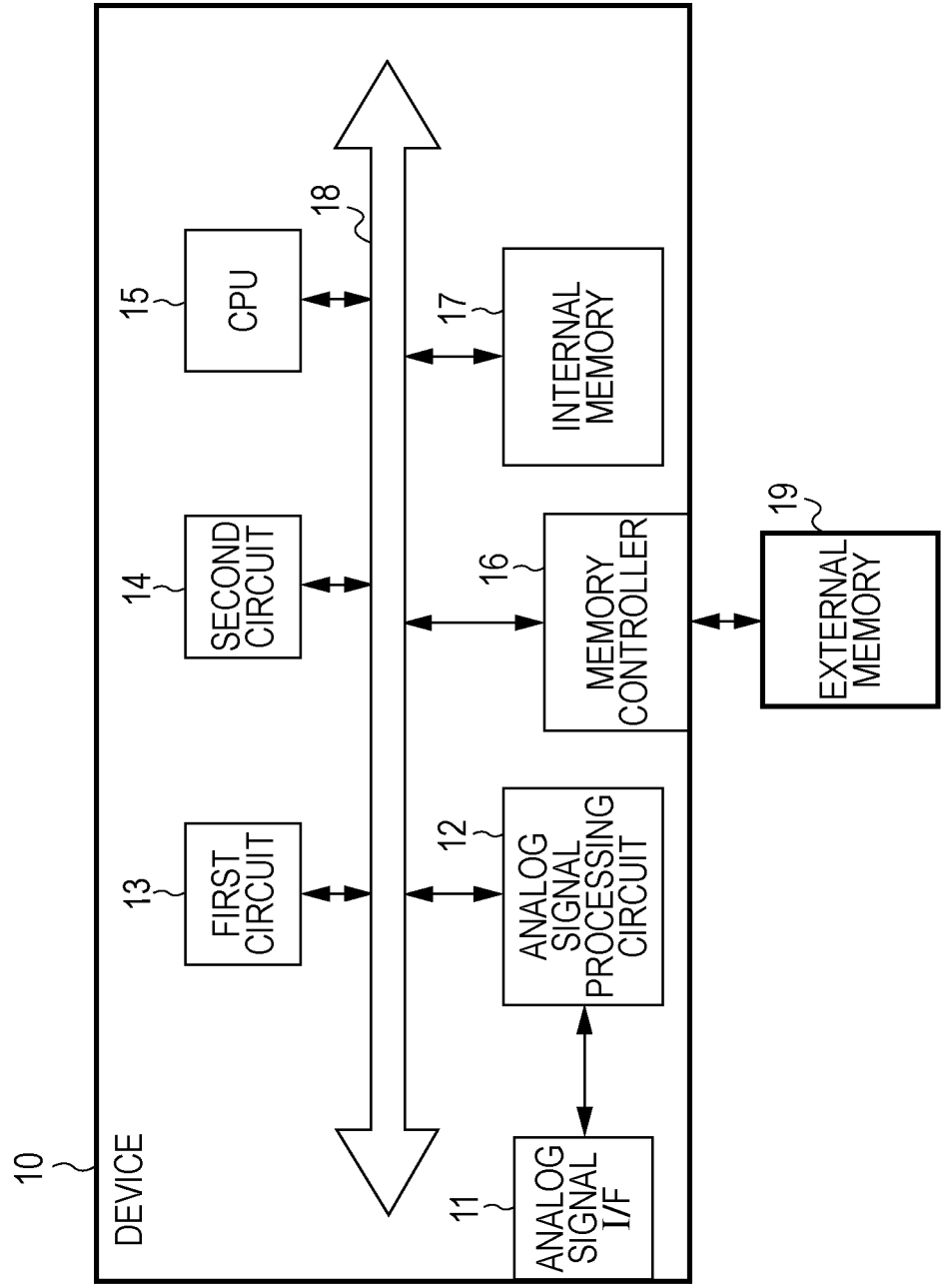
FIG. 1 is a configuration example of a system to which a signal processing device has been applied according to a first embodiment of the present invention.

FIG. 1 is a configuration example of a system 1 to which a signal processing device has been applied according to the first embodiment of the present invention. The system 1 determines and controls the influence of a digital data process on an analog signal process.

In the system 1 of FIG. 1, one device 10 includes an analog signal I/F (Interface) 11, an analog signal processing circuit 12, a first circuit 13, a second circuit 14, a CPU (Central Processing Unit) 15, a memory controller 16, and an internal memory 17.

The analog signal processing circuit 12, the first circuit 13, the second circuit 14, the CPU 15, the memory controller 16, and the internal memory 17 are interconnected by an internal bus 18, which transmits and receives digital data, and respectively process digital data independent of each other.

The analog signal processing circuit 12, the first circuit 13, the second circuit 14, the CPU 15, the memory controller 16, the internal memory 17, and the internal bus 18 are mounted on one semiconductor substrate (chip or die) by the block layout as shown in FIG. 1.

Therefore, the block of the first circuit 13 is arranged to be closer to the block of the analog signal processing circuit 12 than the block of the second circuit 14.

The analog signal I/F 11, the analog signal processing circuit 12, the first circuit 13, the second circuit 14, the CPU 15, the memory controller 16, the internal memory 17, and the internal bus 18 may respectively have a plurality of elements mounted on one semiconductor substrate.

The system 1 may have only a circuit of one of the memory controller 16 and the internal memory 17.

The analog signal I/F 11 is connected to the outside of the device 10, for example, other devices (not shown), and transmits and receives an analog signal to and from the other devices of a connection destination.

The analog signal processing circuit 12 processes an analog signal transmitted by the analog signal I/F 11 or an analog signal received by the analog signal I/F 11.

For example, an analog signal process is an AD (Analog to Digital) conversion process of converting an analog signal into digital data. In addition, for example, the analog signal process includes a DA (Digital to Analog) conversion process of converting digital data into an analog signal, and a calculation process of addition, subtraction, or the like for an analog signal or digital data.

The analog signal processing circuit 12 may be a circuit to which an analog signal is input, a circuit from which an analog signal is output, a circuit to and from which an analog signal is input and output, or a circuit for processing an analog signal.

Among the internal circuits of the device 10, an internal circuit other than the analog signal I/F 11 and the analog signal processing circuit 12 does not handle an analog signal.

Therefore, in the following description, it is assumed that the internal circuit without handling the analog signal among the internal circuits of the device 10 is a digital data processing circuit.

The first circuit 13 and the second circuit 14 process digital data independent of each other. The function of the first circuit 13 and the function of the second circuit 14 may be the same as, or different from, each other.

For example, a digital data process is a data process for signals of image data, audio data, encryption data, or communication data. In addition, for example, the digital data process is a control process using a calculation process of an addition, subtraction, or DSP (Digital Signal Processing) function or the like, a transfer process of DMA (Direct Memory Access) or the like, or a control process using a timer, a clock, or the like.

The memory controller 16 is connected to an external memory 19.

[Description of Operation]

Figure 2:
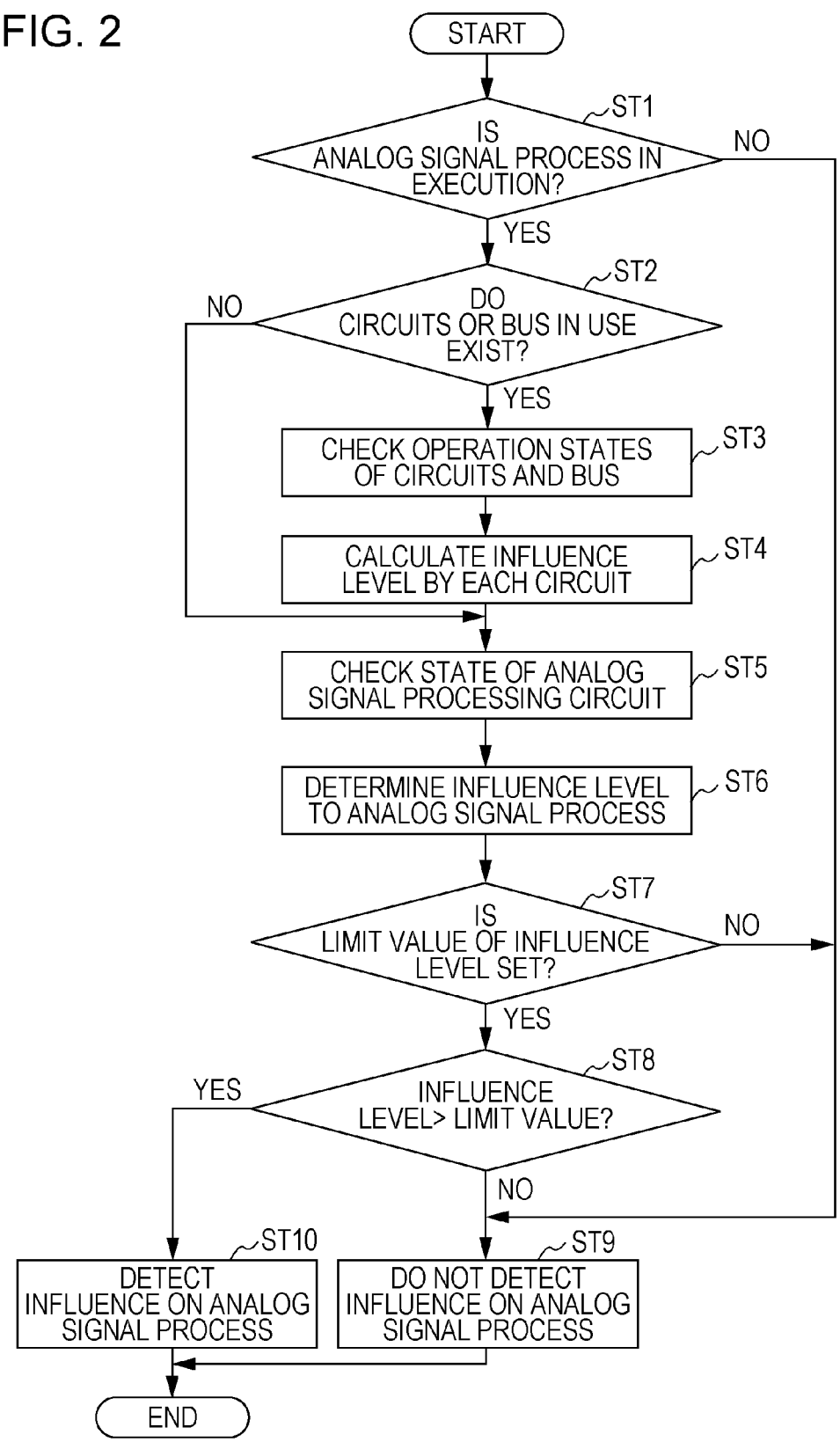
FIG. 2 is an example of a flowchart of a method for determining the influence of a digital data process on an analog signal process in the system of FIG. 1.

FIG. 2 is an example of a method for determining the influence of a digital signal process on an analog signal process in the device 10 of FIG. 1.

For example, this determination method is performed when the CPU 15 repeatedly executes a program (not shown) stored in the internal memory 17. This method may be performed by hardware other than the CPU 15.

According to FIG. 2, the CPU 15 first determines whether or not an analog signal process is in execution (ST1). Then, when the analog signal process by the analog signal processing circuit 12 is not in execution, the CPU 15 terminates the determination process of FIG. 2.

When the analog signal process is in execution, the CPU 15 further determines whether or not internal circuits (the digital data processing circuits 13 to 17) or the internal bus 18 in use exists (ST2).

When the determination of step ST2 is Yes, the CPU 15 checks operation states of the internal circuits and the internal bus 18 of the device 10 (ST3) and calculates an influence level of each circuit (ST4).

The CPU 15 is able to prevent the processes (ST3 and ST4) from being carelessly performed in a state in which no internal circuit is in use by determining the presence or absence of the internal circuit in use before the check step ST3.

The determination process of step ST2 may be omitted. When step ST2 has been omitted, the CPU 15 performs the processes ST3 and ST4 at any time.

Here, for example, information capable of being acquired by the CPU 15 as information indicating operation states of internal circuits or the like in use is clock frequency information of the internal circuits (for example, the first circuit 13 and the second circuit 14) and clock frequency information of the internal bus 18.

In addition, for example, information indicating an operation state capable of being acquired is information regarding an operation status of an internal register value of the CPU 15 or the like, information regarding congestion of the internal bus 18, information regarding a wait time, information regarding an activation state of each internal circuit, or information regarding a value held by each internal circuit.

When the device 10 has an internal sensor such as a temperature sensor (not shown), a detection value detected by the internal sensor may be used as information indicating operation states.

For example, when a clock frequency is high or when a temperature is high, noise generally increases in the analog signal process.

Therefore, in the calculation process ST4 for an influence level by each circuit, the CPU 15 makes a calculation using acquired information indicating operation states of the internal circuits (the digital data processing circuits 13 to 17) and the internal bus 18, and a table or a calculating expression.

For example, when the calculating expression is used, its coefficient value may be determined by referring to a function of each circuit and a function of a register.

In addition, the coefficient value may be determined by referring to physical information regarding a relative position with respect to the analog signal processing circuit 12, a size, or the like of each circuit on the basis of the analog signal processing circuit 12. In general, heat generation or noise of a circuit arranged near the analog signal processing circuit 12 influences the analog signal process.

After the influence level of each circuit has been obtained, the CPU 15 checks a state of the analog signal processing circuit 12 (ST5).

Here, for example, information capable of being acquired by the CPU 15 as information indicating a state of the analog signal processing circuit 12 is information of a register of the analog signal processing circuit 12.

In addition, for example, there is information regarding a wait time, an activation state of each circuit, processing data of the analog signal processing circuit 12, or the like.

When a temperature sensor, a voltage sensor, or a current sensor exists, its detection value may be used. Using the acquired information, the CPU 15 checks the state of the analog signal processing circuit 12.

Next, the CPU 15 determines an influence level to the analog signal process using information regarding an influence level of each circuit and state information regarding the analog signal processing circuit 12 (ST6).

For example, when processing data of the analog signal processing circuit 12 has been checked, the CPU 15 compares the checked data with previous or most recent processing data. Then, the CPU 15 determines the influence level to the analog signal process using the information obtained by the comparison and a table or a calculating expression.

Here, when newly acquired processing data is compared with the most recent processing data, information indicating a momentary increment/decrement amount of noise is able to be obtained by cancelling their similar parts.

When the newly acquired processing data has been compared with processing data measured in advance before shipping or the like, information indicating an absolute noise amount is able to be obtained since a comparison with an ideal data value, signal waveform, or frequency is possible.

Next, the CPU 15 determines the influence of the digital data process on the analog signal process using a value of the influence level to the analog signal process.

Specifically, the CPU 15 first determines whether or not a limit value of the influence level is set (ST7). When the setting is made, the CPU 15 determines whether or not the calculated influence level exceeds the limit value (ST8).

When the limit value is set and the calculated influence level exceeds the limit value, the CPU 15 determines that the analog signal process is influenced (ST10).

In other cases, the CPU 15 determines that the analog signal process is not influenced (ST9).

When it has been determined that the influence on the analog signal process exists by the above-described determination method, the CPU 15 performs the change control of an operation state of a partial circuit of the device 10.

For example, the CPU 15 lowers the clock frequency of the first circuit 13. Under the control, the temperature of the first circuit 13 is lowered. Noise generated from the first circuit 13 is reduced.

In addition, for example, the CPU 15 stops the first circuit 13.

Under the control, the influence of the first circuit 13 on the analog signal process is reduced, thereby improving the quality of the analog signal process. Under the control, the power consumption of the entire system is able to be reduced.

When the first circuit 13 has been stopped, the first circuit 13 may not temporarily perform a process (function) allocated thereto in a stop period.

To suppress this problem, for example, the CPU 15 may execute control content (change content) corresponding to each case by dividing control content (change content) of the first circuit 13 into cases corresponding to processing content, functions, or the like.

As described above, in this embodiment, the CPU 15 determines whether or not the digital data process influences the analog signal process by obtaining an influence level of each of the first circuit 13 and the second circuit 14.

The CPU 15 is able to specify a circuit having the influence by determining the influence level of each circuit as described above.

When it has been determined that the first circuit 13 has the influence, the CPU 15 stops the first circuit 13 as a partial circuit of the digital data processing circuits 13 to 17 or lowers the processing capability of the first circuit 13. That is, the CPU 15 changes the usage or selection of the first circuit 13 in response to the determination result of the influence level.

Therefore, the quality of the analog signal process is able to be improved as an advantage of this embodiment.

The device 10 of this embodiment performs a control operation of suppressing the influence on the analog signal process.

Therefore, the arrangement (layout) is able to be made by making the internal circuits of the device 10 close to each other as compared with that of a device which does not perform the above-described control. The device 10 of this embodiment is able to normally operate the internal circuits under the dense layout.

Consequently, the size of a semiconductor substrate is able to be reduced as an advantage of the embodiment of the present invention.

In the determination method of FIG. 2, the CPU 15 of this embodiment first determines an execution state of the analog signal process (ST1) and does not determine the influence when no analog signal process is executed.

When no analog signal process is executed, the CPU 15 is able to immediately terminate the determination process of FIG. 2 to be repeatedly performed as an advantage of this embodiment.

In the determination method of FIG. 2, the CPU 15 obtains the influence level to the analog signal process using information regarding the influence level of each of the first circuit 13 and the second circuit 14 and state information of the analog signal processing circuit 12 (ST3 to ST6).

When the influence level exceeds the limit value, the CPU 15 determines that all the digital data processing circuits 13 to 17 and the internal bus 18 influence the analog signal process (ST7, ST8, and ST10).

Therefore, as an advantage of this embodiment, the influence is able to be suppressed when the digital signal process actually influences the analog signal process of the analog signal processing circuit 12.

2. Second Embodiment

[Configuration of Signal Processing Device]

Even when an analog circuit and another circuit are mounted on separate devices in one signal processing device, the other circuit of the separate device influences the analog signal process of the analog circuit of one device, thereby lowering the analog performance of the entire device.

In this case, it is desirable not only to determine the influence of the separate device on the analog signal process of the analog signal processing circuit, but also to determine the influence on the analog signal process of the entire system to perform a control operation in response to the determination result.

This enables the quality of the analog signal process of the entire system to be improved.

Figure 3:
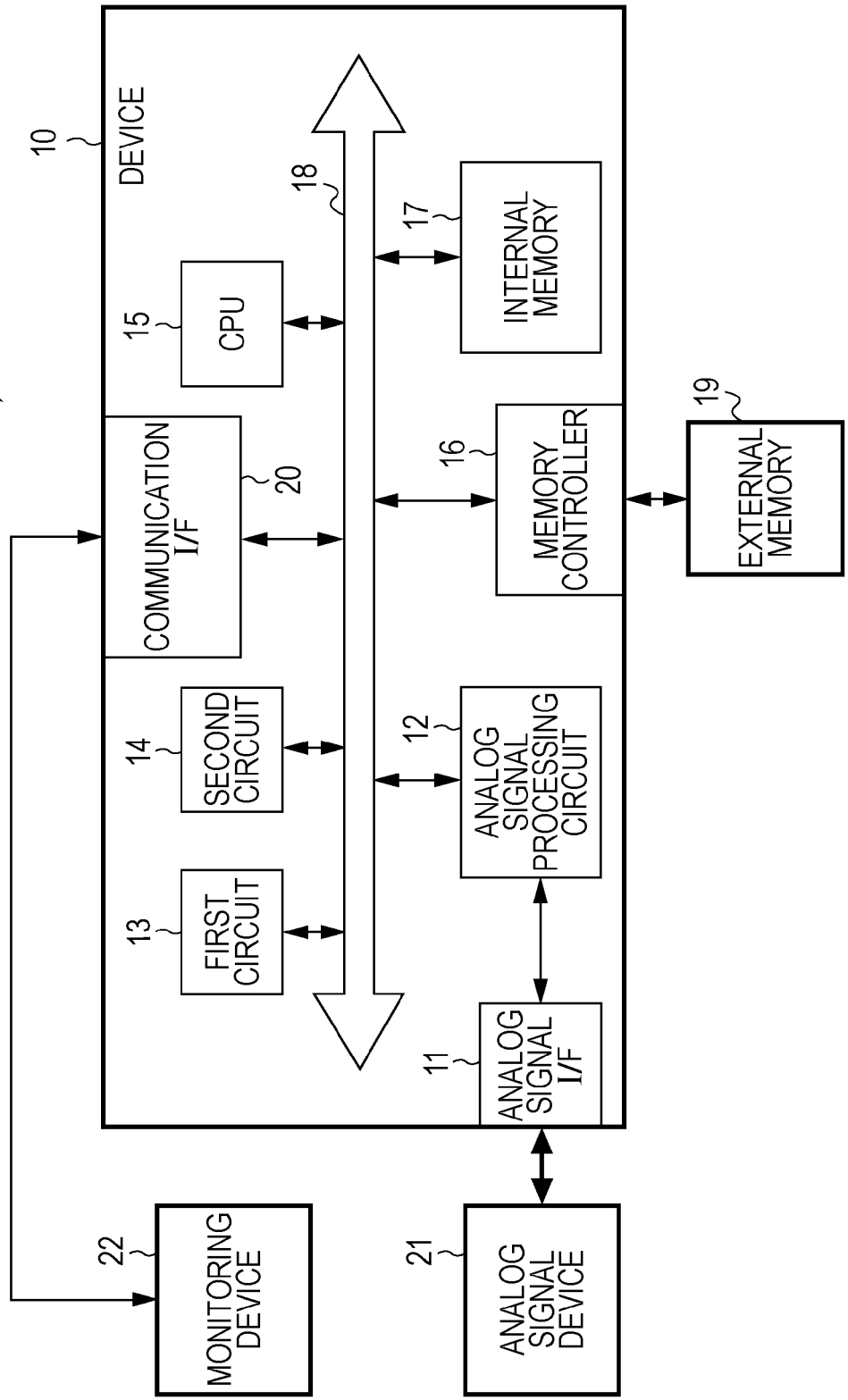
FIG. 3 is a configuration example of a system to which a signal processing device has been applied according to a second embodiment of the present invention.

FIG. 3 is a configuration example of a system 1 to which a signal processing device has been applied according to the second embodiment of the present invention. In the second embodiment, the influence on a separate analog signal device 21 as well as the influence on an analog signal processing circuit 12 is determined.

In the system 1 of FIG. 3, a device 10 and an external memory 19 are in common with the first embodiment. However, a difference is that the system 1 has the analog signal device 21 and a monitoring device 22.

In one system 1, a plurality of elements may exist in one of the devices 10, 19, 21, and 22.

The device 10 is in common with the first embodiment. However, a difference is that a communication I/F 20 is provided.

The communication I/F 20 is connected to an internal bus 18. The communication I/F 20 connected to an external device (here, the monitoring device 22) transmits and receives data.

For example, SPI (System Packet Interface), I2C (Inter-Integrated Circuit), PCIExpress, or the like can be employed as a communication method of the communication I/F 20.

For example, the analog signal device 21 is a device for transmitting or receiving an analog signal of video or audio through an image sensor device, a sensor device, wireless communication, or a wired link.

For example, the image sensor device has a CMOS (Complementary Metal Oxide Semiconductor) sensor or a CCD (Charge Coupled Device) sensor. For example, the sensor device has an LED (Light Emitting Diode). For example, the transmission/reception device has a communication driver and a signal receiver.

The analog signal device 21 has a function of inputting or outputting an analog signal of a sensor, an amplifier, a driver, or the like, and is connected to the analog signal I/F 11 of the device 10. The analog signal device 21 transmits and receives an analog signal to and from the analog signal I/F 11.

The monitoring device 22 has a built-in sensor (not shown).

For example, the built-in sensor is applicable as long as it detects physical information for monitoring the state of the system 1, and is the one detecting a temperature, a voltage, a current, an electromagnetic wave, acceleration, or the like.

The monitoring device 22 may be connected to an external sensor (not shown) instead of including the built-in sensor. The CPU 15 may be included inside the monitoring device 22, not inside the device 10.

[Description of Operation]

Figure 4:
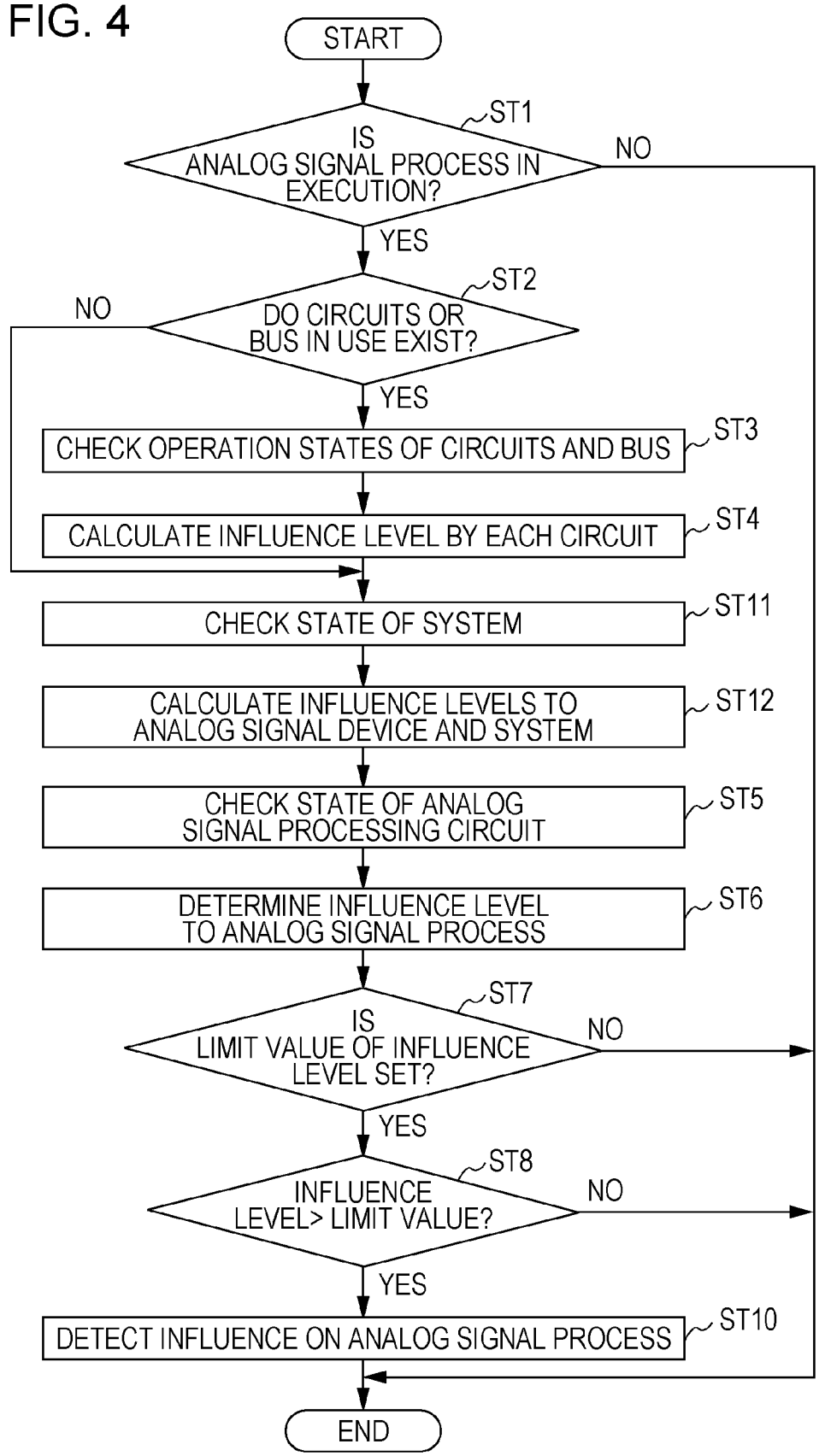
FIG. 4 is an example of a flowchart of a method for determining the influence of a digital data process on an analog signal process in the system of FIG. 3.

FIG. 4 is an example of a method for determining the influence of the digital data process on the analog signal process in the system 1 of FIG. 3. This method determines the influence on the separate analog signal device 21 in addition to the influence on the analog signal processing circuit 12.

For example, the method of FIG. 4 is able to be implemented when a CPU 15 repeatedly executes a program (not shown) stored in an internal memory 17. The method of FIG. 4 may be implemented by hardware other than the CPU 15.

In the method of FIG. 4 different from the method of FIG. 2, the CPU 15 calculates an influence level by each circuit of digital data processing circuits 13 to 18 (ST4) and then checks the state of the entire system 1 using the monitoring device 22 (ST11).

The CPU 15 calculates an influence level to the analog signal device 21 and an influence level to a digital signal transmitted and received between the analog signal I/F 11 and the analog signal device 21 (ST12).

Here, for example, information capable of being acquired by the CPU 15 as information indicating the state of the system 1 is a temperature, a voltage, a current, an electromagnetic wave, or the like within the system 1.

When no monitoring device 22 is present in the system 1, the CPU 15 may perform the determination method of FIG. 4 by skipping step ST11 of checking the state of the system.

Thereafter, as in the method of FIG. 2, the CPU 15 checks the state of the analog signal processing circuit (ST5) and determines the influence level to the analog signal process using the above-described influence levels (ST6).

As described above, the CPU 15 of this embodiment determines whether or not the operations of the digital data processing circuits 13 to 17 influence the analog signal process by obtaining the influence level of each of the first circuit 13 and the second circuit 14.

Therefore, this embodiment is able to have the same advantage as the first embodiment.

Furthermore, the CPU 15 of this embodiment determines the presence or absence of the final influence of the digital data processing circuits 13 to 17 by checking the state of the system and including the influence on the analog signal device 21 in the determination method of FIG. 4.

Therefore, the influence on the analog signal process of the separate analog signal device 21 is able to be suppressed as an advantage of this embodiment.

As an advantage of this embodiment, the influence on the analog signal process is able to be suppressed in the entire system 1 to which the signal processing device has been applied.

3. Third Embodiment

[Description of Configuration]

The system 1 of FIG. 1 or 3 is able to execute in advance the method of FIG. 2 or 4 before actual use or shipping after fabrication thereof.

Therefore, the system 1 of FIG. 1 or 3 is able to execute in advance the method of FIG. 2 or 4 before actual use. The system 1 is able to actually measure and check which circuit of the device 10 when used serves as a noise generation source or influences the analog signal process.

For example, the system 1 of FIG. 1 or 3 is able to write setting information of a table or a calculating expression to the internal memory 17 or a register of an internal control circuit (the CPU 15 or the like) on the basis of the measurement result before actual use.

As described above, the system 1 of FIG. 1 or 3 is able to simplify a determination process of the CPU 15 by storing in advance setting information for determining which circuit influences the analog signal process in which state.

For example, the system 1 of FIG. 1 or 3 is able to operate the first circuit 13 and the second circuit 14 in cooperation with the analog signal process. The system 1 of FIG. 1 or 3 is able to efficiently operate the circuits in the range where the influence on the analog signal process is allowable.

[Description of Operation]

Figure 5:
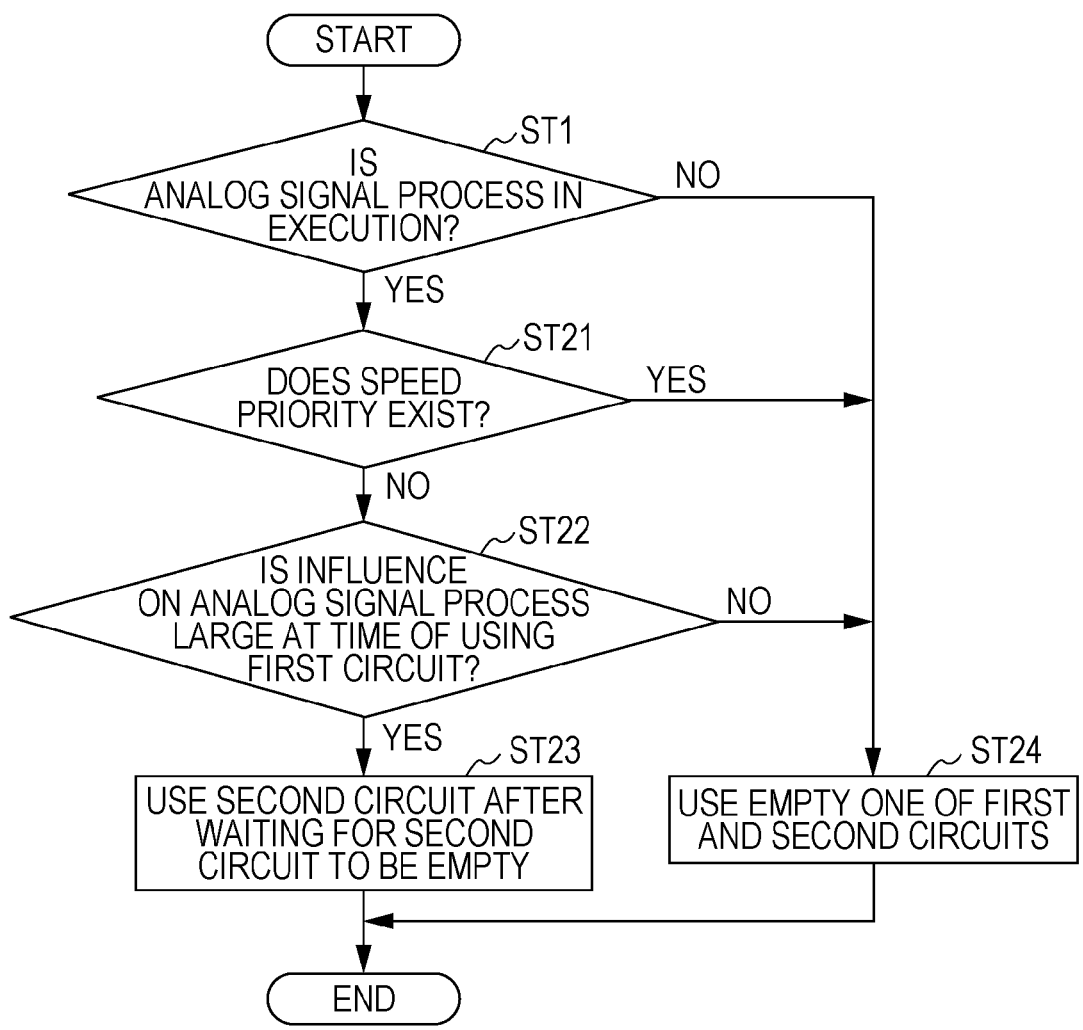
FIG. 5 is an example of a flowchart of a method for determining and controlling the influence of a digital data process on an analog signal process according to a third embodiment of the present invention.

FIG. 5 is an example of a method for determining and controlling the influence of a digital data process on an analog signal process in the system 1 of FIG. 3. This method determines the influence using setting information. The method of FIG. 5 is able to be performed even in the device 10 of FIG. 1.

In this example, the first circuit 13 and the second circuit 14 in FIG. 3 have the same function. In this example, the first circuit 13 is arranged to be closer to the analog signal I/F 11 and the analog signal device 21 than the second circuit 14, and influences the analog signal process.

In the method of FIG. 5, the CPU 15 determines whether or not the analog signal process is in execution (ST1) and further determines whether or not there is the speed priority (ST21).

When there is not the speed priority, the CPU 15 determines whether or not the influence on the analog signal process at the time of using the first circuit 13 is large for the first circuit 13 available in an operating mode without the speed priority (ST22). The CPU 15 makes the determination using the above-described setting information.

For example, when the analog signal process is in execution, the mode is not the speed priority mode, and it has been determined that the influence on the analog signal process by the first circuit 13 is large using the setting information, the CPU 15 prohibits the use of the first circuit 13.

In this case, since the first circuit 13 is not used, only the second circuit 14 is used. The second circuit 14 performs a common process between the first circuit 13 and the second circuit 14. Each process is performed by the second circuit 14 after waiting for the second circuit 14 to be empty (ST23).

Therefore, the processing speed of the system 1 is lowered as compared with the case where the first circuit 13 and the second circuit 14 are used.

In this regard, when the first circuit 13 is not used, the influence on the analog signal process is reduced.

When the analog signal process is not in execution, when there is the speed priority, or when it has been determined that the influence on the analog signal process by the first circuit 13 is not large using the setting information, the CPU 15 permits the use of the first circuit 13.

In this case, both the first circuit 13 and the second circuit 14 are used. When the first circuit 13 and the second circuit 14 simultaneously perform a common process therebetween, each process is processed using an empty one of the first circuit 13 and the second circuit 14.

Therefore, the original processing speed of the system 1 is maintained.

In this regard, since the first circuit 13 is used, there is a possibility that the analog signal process may be influenced.

A control operation of use permission/prohibition of the first circuit 13 may be executed by software or may be executed by hardware, for example, using an arbiter circuit (not shown) of the internal bus 18.

For example, the CPU 15 may control the arbiter circuit of the internal bus 18 so that the first circuit 13 is not substantially used. The first circuit 13 is stopped, or the processing capability is lowered, by this indirect control.

When the performances or functions of the first circuit 13 and the second circuit 14 are not completely identical, determination conditions may be optimized in response to processing content by adding other determination conditions.

As described above, in this embodiment, the first circuit 13 and the second circuit 14 having the common function are mounted on the same device 10 as the analog signal processing circuit 12, and are arranged at different distances from the analog signal processing circuit 12.

Furthermore, when it has been determined that the influence on the analog signal process exists by the method of FIG. 5, the CPU 15 performs a control operation so that the first circuit 13 is not used.

For example, when it has been determined that the operation of the first circuit 13 arranged near the analog signal processing circuit 12 influences the analog signal process, the CPU 15 performs the control operation so that the first circuit 13 is not used. At this time, the second circuit 14 executes the process of the first circuit 13 instead thereof.

Therefore, even when the first circuit 13 is stopped, a function incapable of being performed in the stop period is prevented from being generated as an advantage of this embodiment.

In the method of FIG. 5, the CPU 15 of this embodiment determines whether or not there is the speed priority by acquiring the state information of the digital data processing circuits 13 to 17.

The CPU 15 determines whether or not the first circuit 13 available in an operation state corresponding to whether or not there is the speed priority influences the analog signal process using setting information.

It is not necessary for the CPU 15 to determine whether or not the first circuit 13 actually influences the analog signal process of the analog signal processing circuit 12 every time when the determination control is performed.

The CPU 15 is able to determine the possibility using the setting information and control the first circuit 13 without suppressing the influence. The CPU 15 is able to determine the influence by a simple process as compared with the case where a determination is made by acquiring detailed operation information of a circuit.

Consequently, the influence is able to be determined by a simple determination process as an advantage of this embodiment.

[Configuration of Modified Example Capable of Setting Operating Conditions]

In a control operation of suppressing the influence on the analog signal process, operating conditions of a circuit may be changed without stopping a circuit within the device 10.

Figure 6:
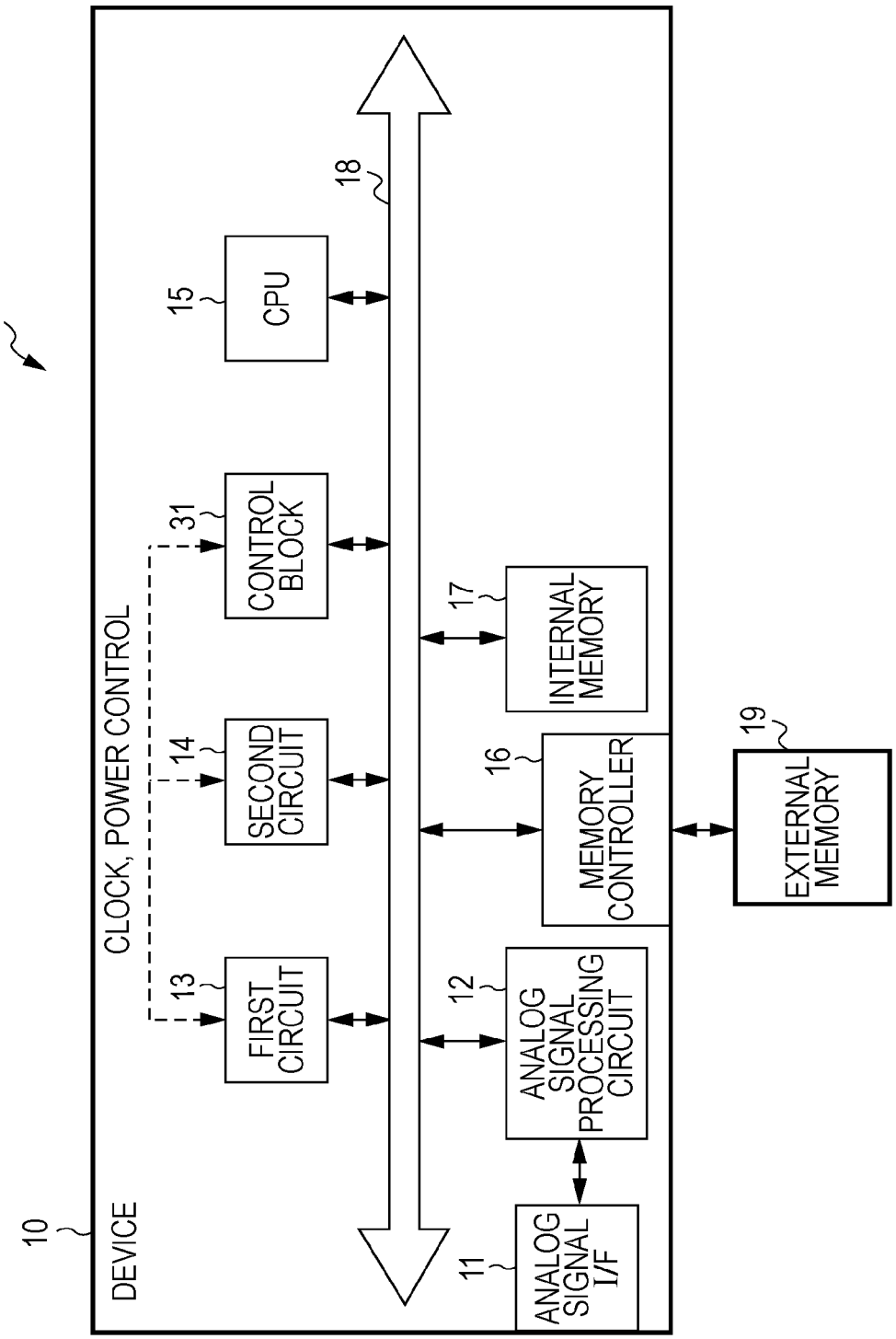
FIG. 6 is a configuration example of a system to which a signal processing device has been applied according to the third embodiment of the present invention.

FIG. 6 is a modified example of a system 1 to which a signal processing device has been applied according to the third embodiment of the present invention. The system 1 is able to change operating conditions of a circuit within a device 10.

In the system 1 of FIG. 6, the device 10 and an external memory 19 are in common with the third embodiment. However, a difference is that the device 10 has a control block 31.

A control block 31 changes operating conditions of the first circuit 13 and the second circuit 14 within the device 10. For example, the control block 31 changes a power supply voltage, a clock frequency, or the like to be supplied to a first circuit 13 or a second circuit 14.

For example, the power supply voltage is able to be switched between ON and OFF or to increase or decrease a voltage value. The frequency value of the clock frequency can be increased or decreased.

In general, power consumption when the two same circuits are used is able to be lower than that when a circuit operates at twice the frequency.

Therefore, in the device 10 of FIG. 6, power consumption when both the first circuit 13 and the second circuit 14 are used is able to be lower than that when one circuit of the first circuit 13 and the second circuit 14 operates at twice the frequency.

To suppress the influence on the analog signal process, the power of one circuit (the first circuit 13) may be dropped and the frequency of the other circuit (the second circuit 14) may be raised. Under this control, the influence on the analog signal process is able to be suppressed and the total processing capability of the first circuit 13 and the second circuit 14 is able to be maintained and improved.

[Operation of Modified Example Capable of Setting Operating Conditions]

Figure 7:
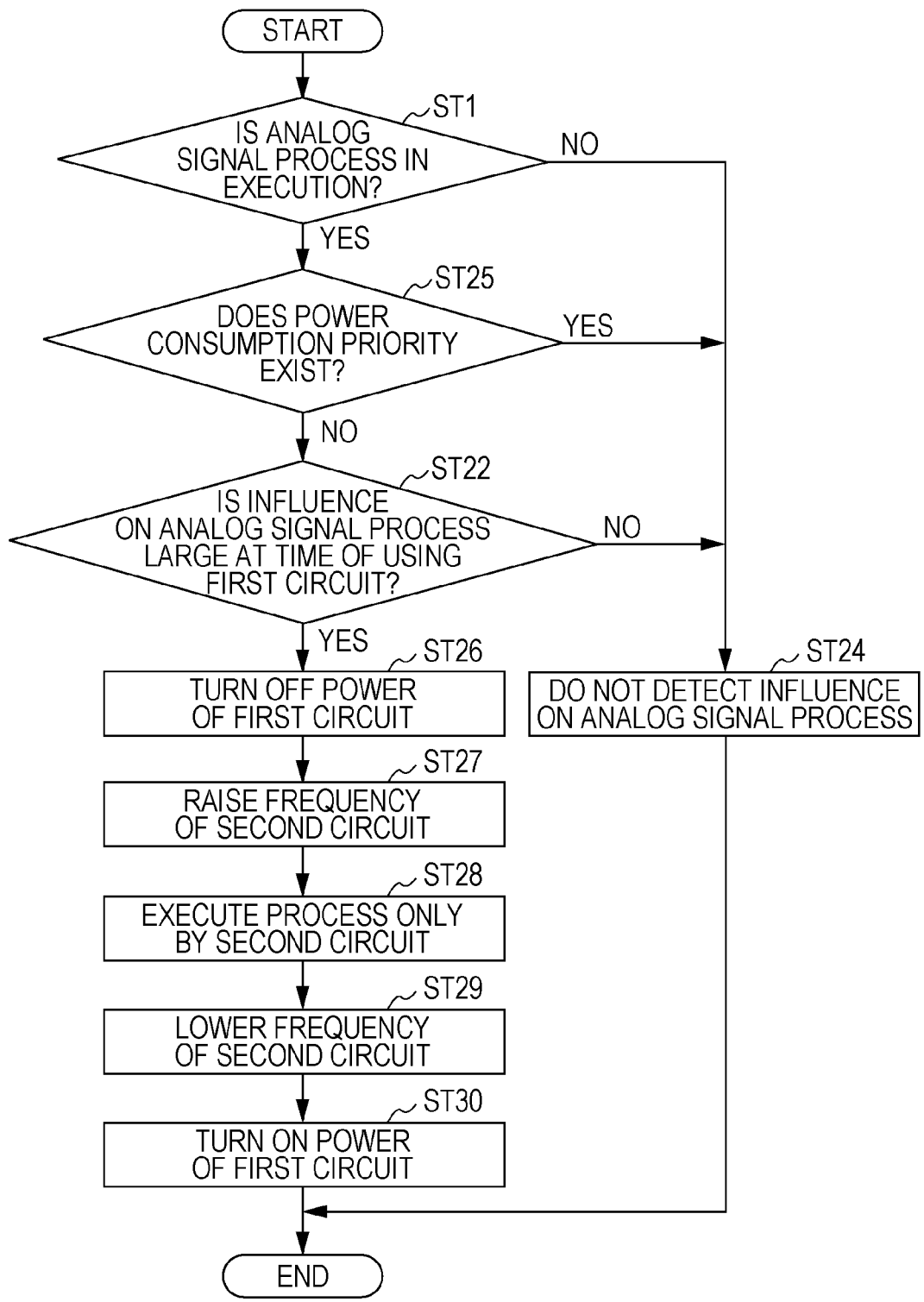
FIG. 7 is an example of a flowchart of a method for determining and controlling the influence of a digital data process on an analog signal process in the system of FIG. 6.

FIG. 7 is an example of a method for determining and controlling the influence of a digital data process on an analog signal process in the device 10 of the modified example of FIG. 6. In the device 10 of FIG. 6, the first circuit 13 may influence the analog signal process.

After determining the operation state of the device 10 by determination steps ST1, ST25, and ST22 using setting information, the CPU 15 performs the change control of the operating conditions of the first circuit 13 and the second circuit 14 in response to the determination result (ST26 to ST30 and ST24).

In the case where it has been determined that the influence on the analog signal process is large when the first circuit 13 has been used in the determination of step ST22, the CPU 15 changes the operating conditions of the first circuit 13 and the second circuit 14.

Specifically, the CPU 15 turns off the power of the first circuit 13 (ST26) and raises the frequency of the second circuit 14 (ST27).

This enables only the second circuit 14 to execute the process (ST28).

Thereafter, when the process is completed, the CPU 15 returns the frequency of the second circuit 14 (ST29) and turns on the power of the first circuit 13 (ST30).

In other determinations, the CPU 15 does not change the operation states of the first circuit 13 and the second circuit 14. In this case, the first circuit 13 and the second circuit 14 execute the process together (ST24).

In the system 1 of FIG. 6, circuits as change control targets of the operating conditions are not limited to the first circuit 13 and the second circuit 14.

The number of circuits as change control targets of the operating conditions may be one or at least three.

The CPU 15 may change the operating conditions by control content in addition to power supply stop control and frequency change control (operating speed reduction control).

For example, the CPU 15 may change the operating conditions by a control operation of reducing a power supply voltage or a control operation of limiting a use frequency of a circuit.

In response to the operation state of the device 10 (the system 1), the CPU 15 may change the content of change control step by step.

For example, the CPU 15 may stop the first circuit 13 in a high-quality photography mode and may lower a power supply voltage, a frequency, or the like of the first circuit 13 in a continuous photography mode.

The CPU 15 is able to exactly control the influence on the analog signal process by minutely changing the content in a more step-by-step fashion.

For example, when the device 10 of FIG. 6 is used by the system 1 of the FIG. 3, the CPU 15 is able to also control the power and clock frequencies of other devices (the external memory 19, the analog signal device 21, and the monitoring device 22) in the system 1. In this case, the CPU 15 is able to operate the entire system 1 at higher performance.

The influence on the analog signal process is able to be suppressed even in a reconfigurable device like an FPGA (Field Programmable Gate Array) or a reconfigurable circuit by applying a method for performing the change control of the operating conditions.

Specifically, the reconfigurable device is able to more efficiently use a circuit by reconfiguring each circuit under the operating conditions of suppressing the influence on the analog signal process.

That is, even when the same circuit is used, a circuit is able to be more efficiently used by dynamically changing a processing type or content in response to the restriction of operating conditions.

For example, when an image or audio storage process is executed, a circuit is able to be more efficiently used by changing processing content between compression and non-compression in response to the restriction of operating conditions.

In addition, for example, a circuit is able to be more efficiently used by changing a compression algorithm, a calculation algorithm, bit accuracy, or the like, or changing a method for using software or a calculation circuit, in response to the restriction of operating conditions.

The throughput in a circuit group (for example, the first circuit 13 and the second circuit 14) to undergo the change control is able to be reduced by changing a processing type or content.

Therefore, even when the operating conditions of the circuit group are restricted by the change control, the data processing capability of the circuit group (the device 10) may be prevented from being lowered.

For example, even in the operating condition that the number of available circuits of the first circuit 13 and the second circuit 14 is reduced or the clock frequency is lowered, the total data processing capability (data throughput or the like) of the first circuit 13 and the second circuit 14 is able to be maintained and improved.

Instead of the setting information used in step ST22 of FIG. 7, other setting information may be written to the register of the control circuit (the CPU 15) or the internal memory 17.

For example, setting information in which the determination content of steps ST1 and ST21 is associated with the control content of steps ST25 to ST29 may be written.

In the case of the setting information, the influence on the analog signal process is able to be determined by the determinations of steps ST1 and ST21. When the influence on the analog signal process exists, the internal circuit of the device 10 is able to be controlled to suppress the influence.

In the case of the setting information, it is not necessary for the CPU 15 to determine the influence generated when the first circuit 13 has been used every time when the determination process is performed.

As described above, the system 1 of the modified example stops the first circuit 13 and raises the processing capability of the remaining second circuit 14, which is not stopped.

Therefore, the system 1 of the modified example is able to compensate for the lowered processing capability of the first circuit 13 by the raised processing capability of the second circuit 14.

Therefore, even when the processing capability of the first circuit 13 has been lowered in the system 1 of the modified example, the processing capability of the common function between the first circuit 13 and the second circuit 14 is not lowered.

Consequently, the processing capability is able to be maintained as an advantage of this modified example.

4. Fourth Embodiment

[Description of Configuration]

The determination control method described in the third embodiment is available even in a signal processing device having a plurality of processors or calculation units besides the systems 1 of FIGS. 1, 3, and 6.

Figure 8:
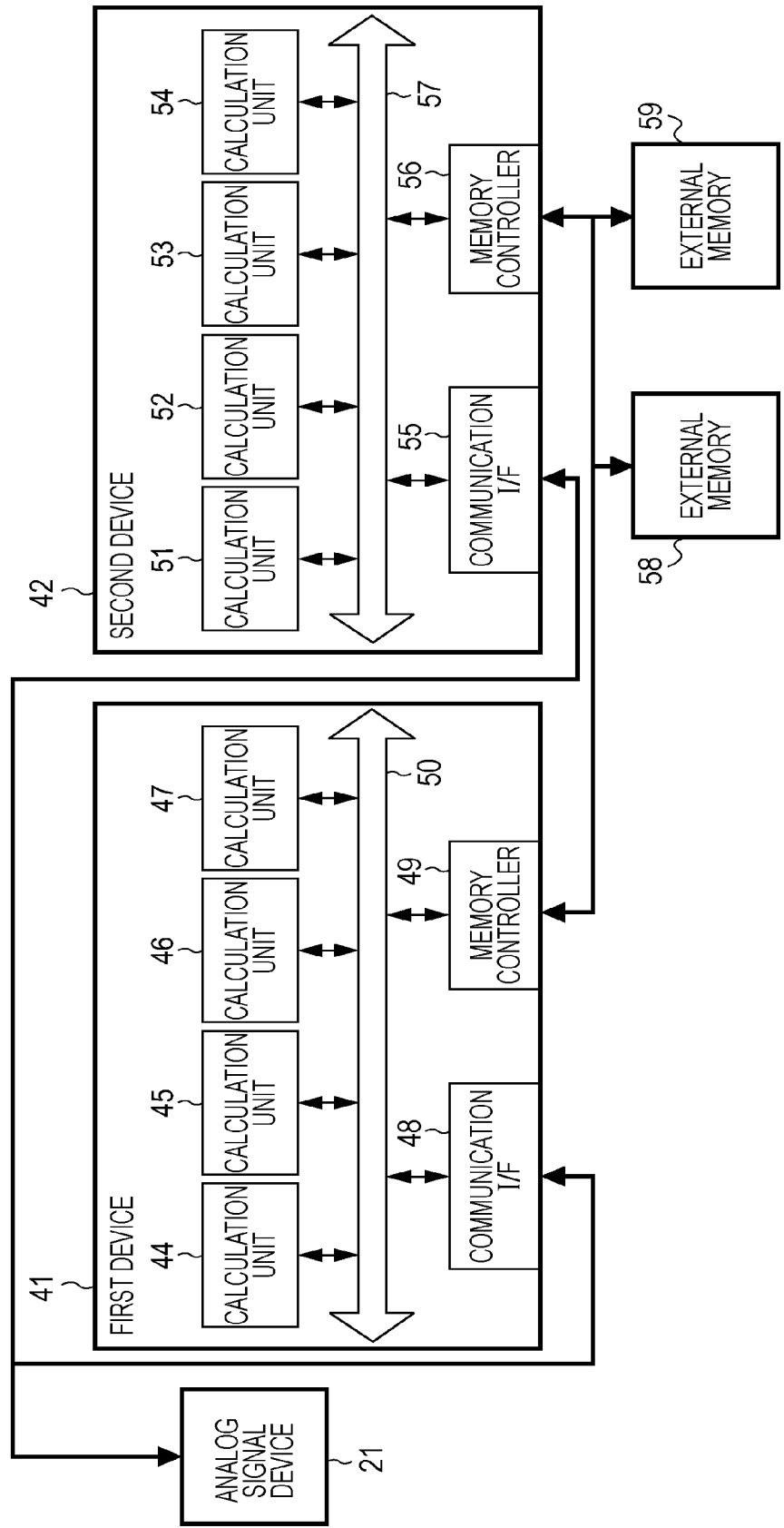
FIG. 8 is a configuration example of a system to which a signal processing device has been applied according to a fourth embodiment of the present invention.

FIG. 8 is a configuration example of a system 1 to which a signal processing device has been applied according to the fourth embodiment of the present invention.

The system 1 of FIG. 8 has a first device 41, a second device 42, an analog signal device 21, and two external memories 58 and 59.

The first device 41 has four calculation units 44 to 47, a communication I/F 48, a memory controller 49, and an internal bus 50.

The second device 42 has four calculation units 51 to 54, a communication I/F 55, a memory controller 56, and an internal bus 57.

As described above, the first device 41 or the second device 42 has a plurality of calculation units (a plurality of processors).

In one system 1, each device (the first device 41, the second device 42, the analog signal device 21, or the external memory 58 or 59) may include several devices and types. In each device, each internal circuit may include several internal circuits and types.

For example, the calculation units 44 to 47 and 51 to 54 are processors, DSPs, vector calculators, or SIMD (Single Instruction Multiple Data) circuits, which have a calculation function.

The memory controllers 49 and 56 are connected to the plurality of external memories 58 and 59.

The two communication I/Fs 48 and 55 are connected to the analog signal device 21.

The first device 41 and the second device 42 may not only communicate with the devices 58, 59, and 21 of connection destinations thereof, but also communicate with each other.

[Description of Operation]

Like the example of the device 10 of the third embodiment, the system 1 of FIG. 8 is able to actually measure and check which circuit of the system 1 when used influences the analog signal process in advance before actual use.

For example, the system 1 of FIG. 8 is able to actually measure and check in advance which calculation unit of the calculation units 44 to 47 and 51 to 54 within the system 1 influences the analog signal process.

Before actual use, the system 1 of FIG. 8 is able to write setting information based on the check result to the internal memory 17 or registers of internal control circuits (the calculation units 44 to 47 and 51 to 54 and the like).

For example, the system 1 of FIG. 8 is able to write information regarding devices (the first device 41 and the second device 42) or the calculation units 44 to 47 and 51 to 54 influencing the analog signal process.

In addition, for example, the system 1 of FIG. 8 is able to write information regarding the devices or the calculation units 44 to 47 and 51 to 54 used when a predetermined process is executed.

In the case of actual use, the control circuit determines whether or not the analog signal process is in execution and selects the devices (the first device 41 and the second device 42) and the calculation units 44 to 47 and 51 to 54 to be used in response to the determination result.

For example, when the analog signal process is in execution, the control circuit selects the calculation units 51 to 54 and stops the calculation units 44 to 47.

In this case, when the calculation units 51 to 54 are already in use, each process is executed by the empty calculation units 51 to 54 after waiting for the process in use to be completed.

On the other hand, when the analog signal is not in execution, the control circuit selects the calculation units 44 to 47 and 51 to 54.

In this case, when the calculation units 51 to 54 are already in use, each process is executed by the calculation units 44 to 47.

The control circuit may stop only the calculation unit 44 and 45 and use the calculation units 46 to 54 in the process.

The system 1 of FIG. 8 is able to avoid the use of the calculation units 44 to 47 influencing the analog signal process by the change control.

Therefore, this embodiment is not only excellent in execution speed and processing capability, but also excellent in the performance of the analog signal process as advantages of this embodiment.

5. Fifth Embodiment

[Description of Configuration]

To suppress the influence of a digital data process on an analog signal process, the above-described embodiment performs the change control of the operating conditions of a partial circuit (for example, the first circuit 13) of the digital data processing circuit in response to the determination result of the influence on the analog signal process.

In addition, for example, to suppress the influence on the analog signal process, the operation of the analog signal processing circuit 12 may undergo the change control after making the determination of the above-described embodiment.

For example, the system 1 of FIG. 6 determines the influence on the analog signal process by executing the determination method of FIG. 7 and performing the change control of the operations of the first circuit 13 and the second circuit 14.

Instead of this change control, the operating conditions of the analog signal processing circuit 12 may undergo the change control.

[Description of Operation]

Figure 9:
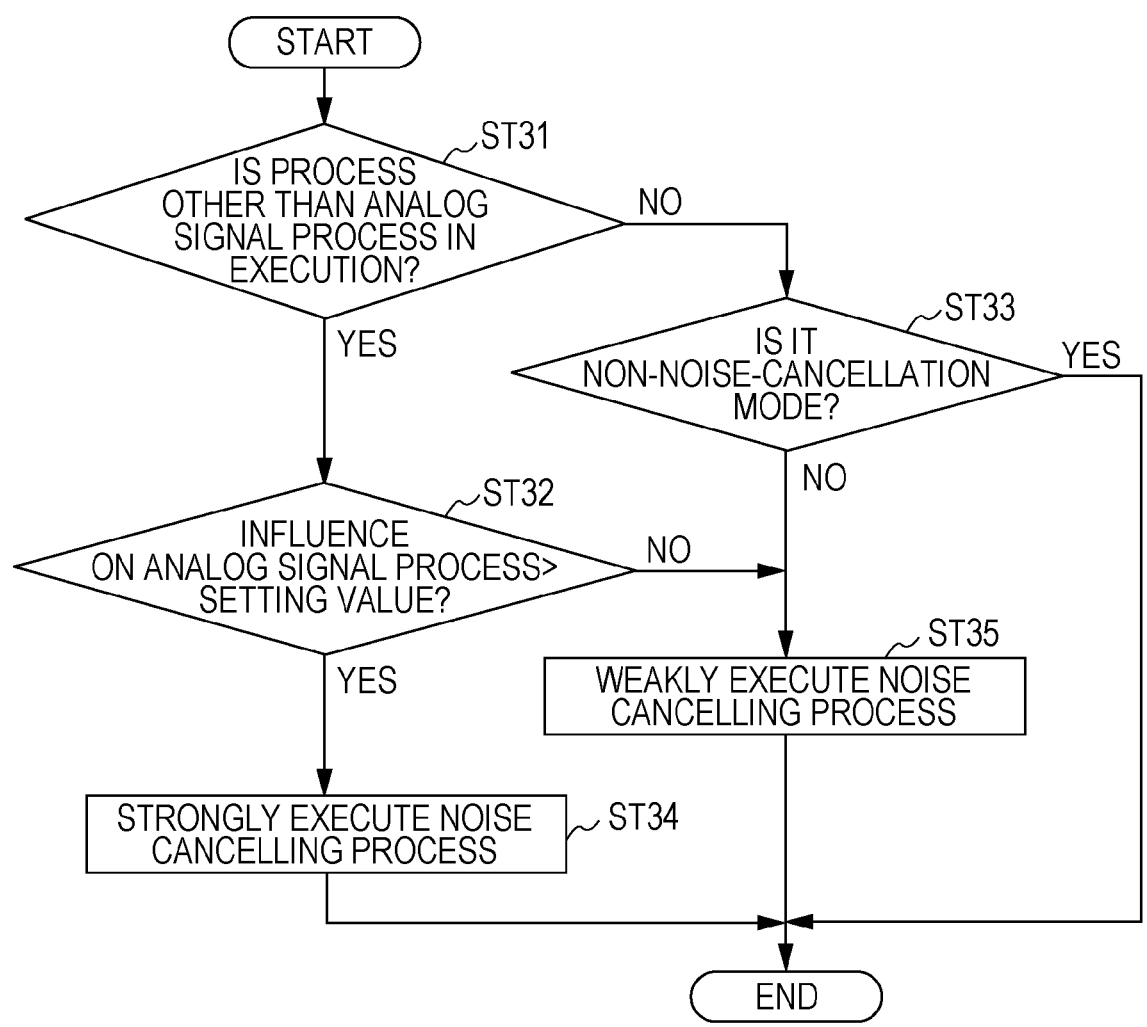
FIG. 9 is an example of a flowchart of a method for determining and controlling the influence of a digital data process on an analog signal process according to a fifth embodiment of the present invention.

FIG. 9 is an example of a method for determining and controlling the influence of a digital data process on an analog signal process in the device 10 of FIG. 6.

To identify the operation state of the device 10 in the example of FIG. 9, the CPU 15 determines whether or not a process other than the analog signal process is in execution (ST31) and determines whether or not an influence level to the analog signal process is greater than a setting value (ST32). The CPU 15 further determines whether or not the mode is a non-noise-cancellation mode (ST33).

When the process other than the analog signal process is in execution and the influence level to the analog signal process is greater than the setting value, the CPU 15 instructs the analog signal processing circuit 12 to execute a "strong" noise cancelling process (ST34).

On the other hand, when the process other than the analog signal process is not in execution or when the influence level to the analog signal process is less than the setting value, the CPU 15 instructs the analog signal processing circuit 12 to execute a "weak" noise cancelling process (ST34).

On the basis of the instructions from the CPU 15, an analog signal is processed by changing the strength of the noise cancelling process by the analog signal processing circuit 12.

For example, information capable of being used for the determination of step ST32 is noise information corresponding to the operation state of each circuit within the device 10.

For example, information indicating the operation state of each circuit is a frequency of the first circuit 13, a continuous operation time (use information) of the first circuit 13, a temperature of the first circuit 13, register information of the first circuit 13, or the like.

Using preset information, the CPU 15 may determine whether or not the influence on the analog signal process is greater than the setting value.

For example, when the frequency of the first circuit 13 is equal to or greater than 200 MHz, the CPU 15 may determine that the analog signal process is influenced on the basis of the setting information.

In addition, for example, when the first circuit 13 is continuously in operation during at least 1 μsec, the CPU 15 may determine that the analog signal process is influenced on the basis of the setting information.

The noise cancelling process for suppressing the influence on the analog signal process may be digitally processed by a circuit other than the analog signal processing circuit 12.

For example, in the case where the CPU 15 executes the noise cancelling process, the CPU 15 first stores the determination result when the analog signal processing circuit 12 processes the analog signal.

After the analog signal process is completed, the CPU 15 may execute the noise cancelling process having the strength corresponding to the influence for digital data obtained by processing the analog signal.

Therefore, the influence on the analog signal process is able to be suppressed as an advantage of this embodiment.

Since the influence on all analog signal processes may not be uniform, the analog signal processing circuit 12 may raise the strength of the noise cancelling process only for a part of the analog signal.

6. Sixth Embodiment

[Description of First Configuration Example]

To suppress the influence of a digital data process on an analog signal process, the configuration of a device or system (circuit arrangement or layout) may be designed in addition to the execution of an influence suppression method in each embodiment described above.

As compared with the case where the influence on the analog signal process is suppressed simply by a control operation, the influence on the analog signal process is able to be suppressed at a higher level, and a decrease in digital data processing capability is able to be suppressed, by designing the layout.

For example, a large-sized digital circuit (functional block) is apt to have a large influence on the analog signal process.

Figure 10:
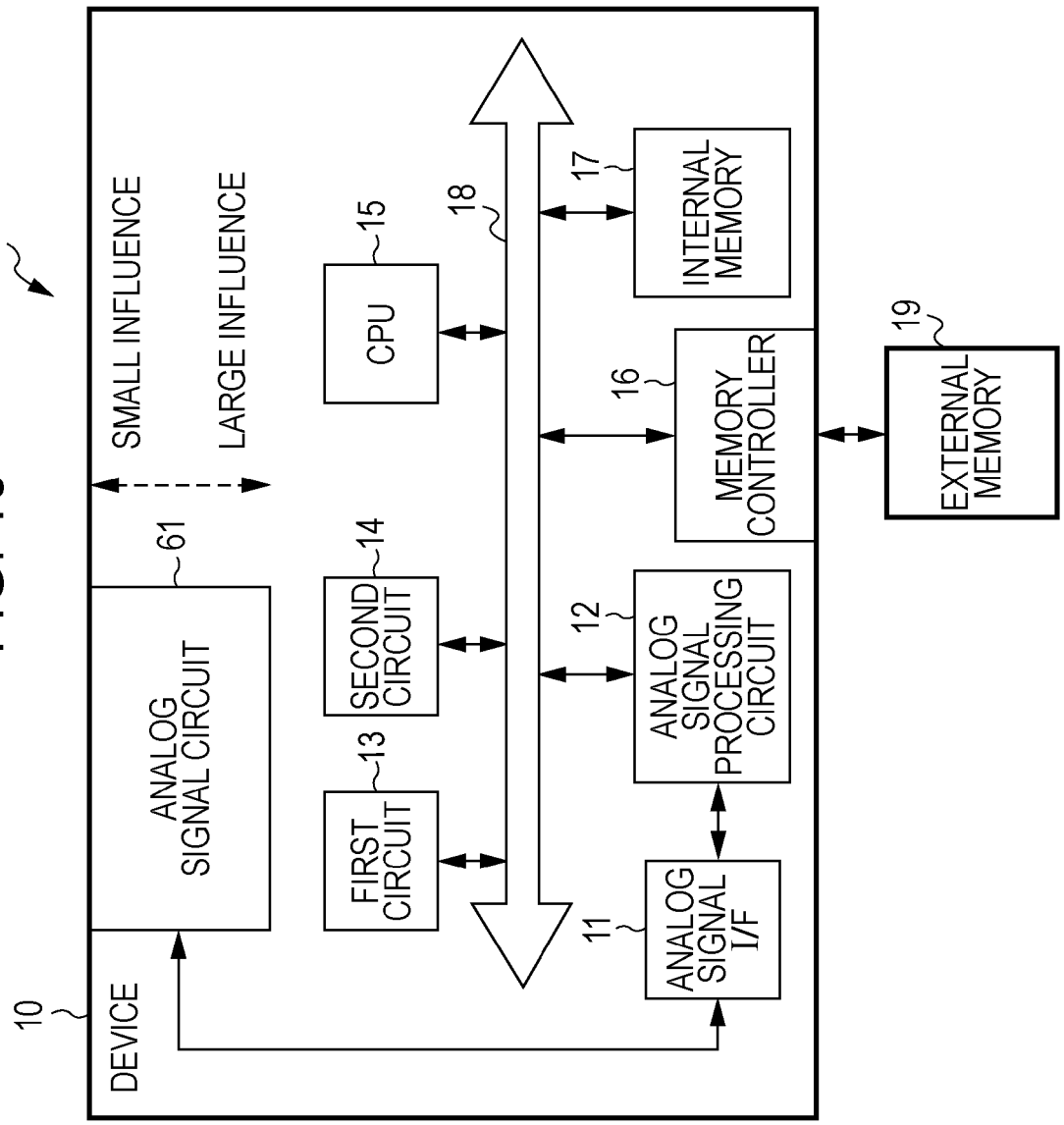
FIG. 10 is a first configuration example of a system to which a signal processing device has been applied according to a sixth embodiment of the present invention.

Therefore, the large-sized digital circuit may be arranged apart from the analog signal processing circuit, arranged in the form in which it is difficult to influence the analog signal process, or arranged in the form in which the influence on the analog signal process is easily predicted. FIG. 10 shows one example thereof.

FIG. 10 is a first configuration example of a system 1 to which a signal processing device has been applied according to the sixth embodiment of the present invention. Here, a device 10 and an external memory 19 are in common with the first embodiment. However, a difference is that an analog signal circuit 61 is provided in the device 10.

For example, the same circuit mounted on the analog signal device 21 of FIG. 3 may be applicable to the analog signal circuit 61. An analog signal I/F 11 and the analog signal circuit 61 are connected within the device 10 and transmit and receive an analog signal.

Each element of FIG. 10 is mounted on one semiconductor substrate (not shown) by the block layout shown in FIG. 10.

Specifically, the analog signal I/F 11, an analog signal processing circuit 12, a first circuit 13, a second circuit 14, a CPU 15, a memory controller 16, an internal memory 17, an internal bus 18, and the analog signal circuit 61 are mounted on one semiconductor substrate.

On the semiconductor substrate, the block of the analog signal circuit 61 is arranged along one side of the semiconductor substrate.

The blocks of the analog signal I/F 11, the analog signal processing circuit 12, the first circuit 13, the second circuit 14, the CPU 15, the memory controller 16, the internal memory 17, and the internal bus 18 are arranged along one side of the block of the analog signal circuit 61.

The influence on the analog signal process is easily predicted by the layout.

For example, in the case of FIG. 10, it is possible to expect that the first circuit 13 and the second circuit 14 arranged adjacent to one side of the block of the analog signal circuit 61 influence the analog signal process.

In a control operation when it has been determined that the analog signal process is influenced, it is not necessary to change a noise cancelling process for all analog signals to be processed by the analog signal circuit 61.

For example, the strength of the noise cancelling process is to be set to the strong mode only for analog signals processed by the analog signal circuit 61 in the vicinity of the first circuit 13 and the second circuit 14.

[Description of Second Configuration Example]

Figure 11:
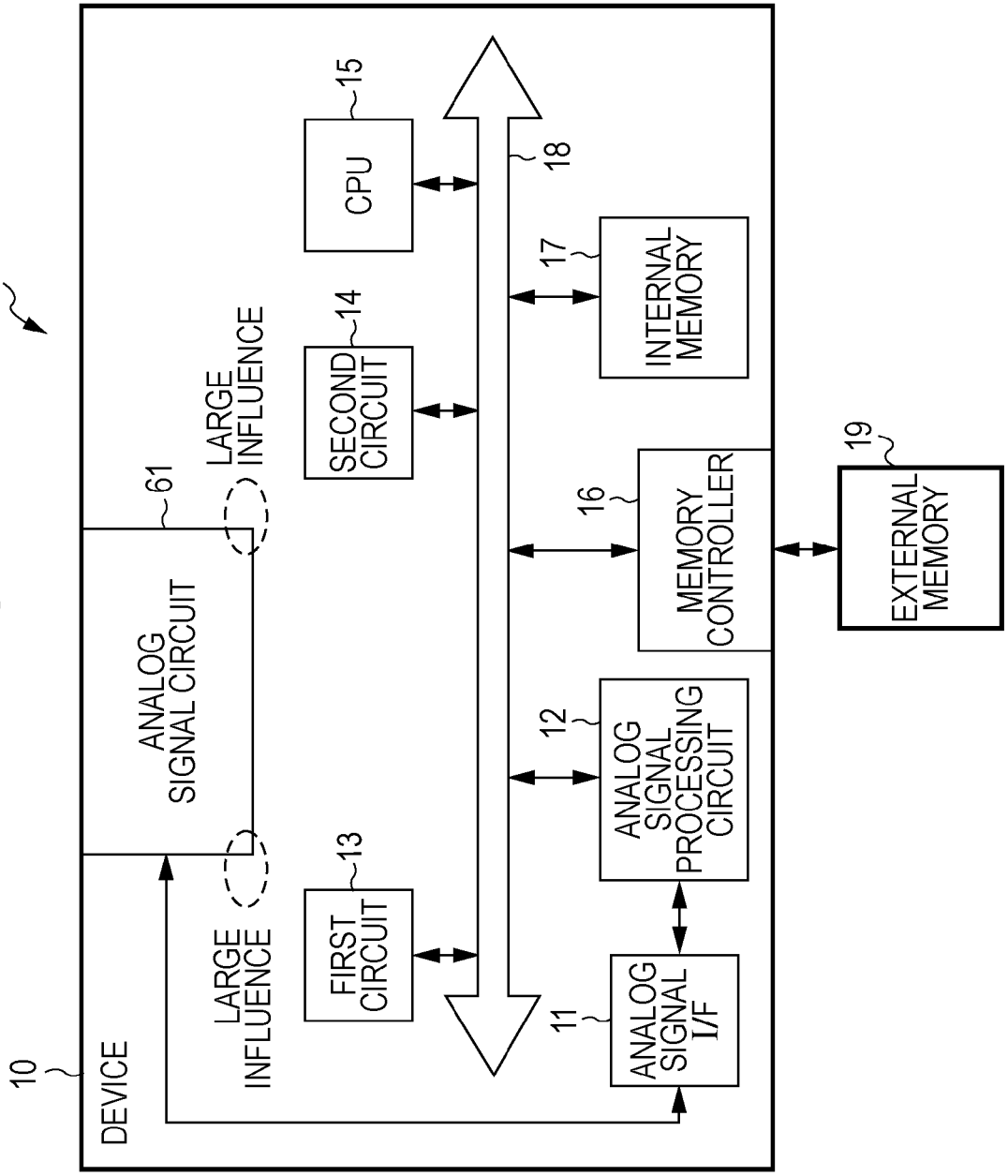
FIG. 11 is a second configuration example of a system to which a signal processing device has been applied according to the sixth embodiment of the present invention.

FIG. 11 is a second configuration example of a signal processing device according to the sixth embodiment of the present invention. Here, a device 10 and an external memory 19 are in common with the first embodiment. However, a difference is that an analog signal circuit 61 is provided in the device 10.

When the device 10 of FIG. 11 is compared with the device 10 of FIG. 10, a difference is that the block of the first circuit 13 and the block of the second circuit 14 are laid out to be separated from each other and arranged in a direction diagonal to the block of the analog signal circuit 61.

In the layout of FIG. 11, it is expected that the first circuit 13 and the second circuit 14 influence the analog signal process.

In this case, the strength of the noise cancelling process is to be set to the strong mode for only partial analog signals processed at two edge portions of the block of the analog signal circuit 61 (a portion adjacent to the first circuit 13 and a portion adjacent to the second circuit 14).

For example, as in the case where the analog signal circuit 61 is an image sensor circuit, the influence of the first circuit 13 and the second circuit 14 may be neglected in the case of a circuit for processing the analog signal only by a center portion of the block of the analog signal circuit 61.

In this case, it is not necessary to change the noise cancelling process only by the operations of the first circuit 13 and the second circuit 14. For example, the strength of the noise cancelling process may be changed by determining the operation state of an element other than the first circuit 13 and the second circuit 14.

[Description of Third Configuration Example]

Figure 12:
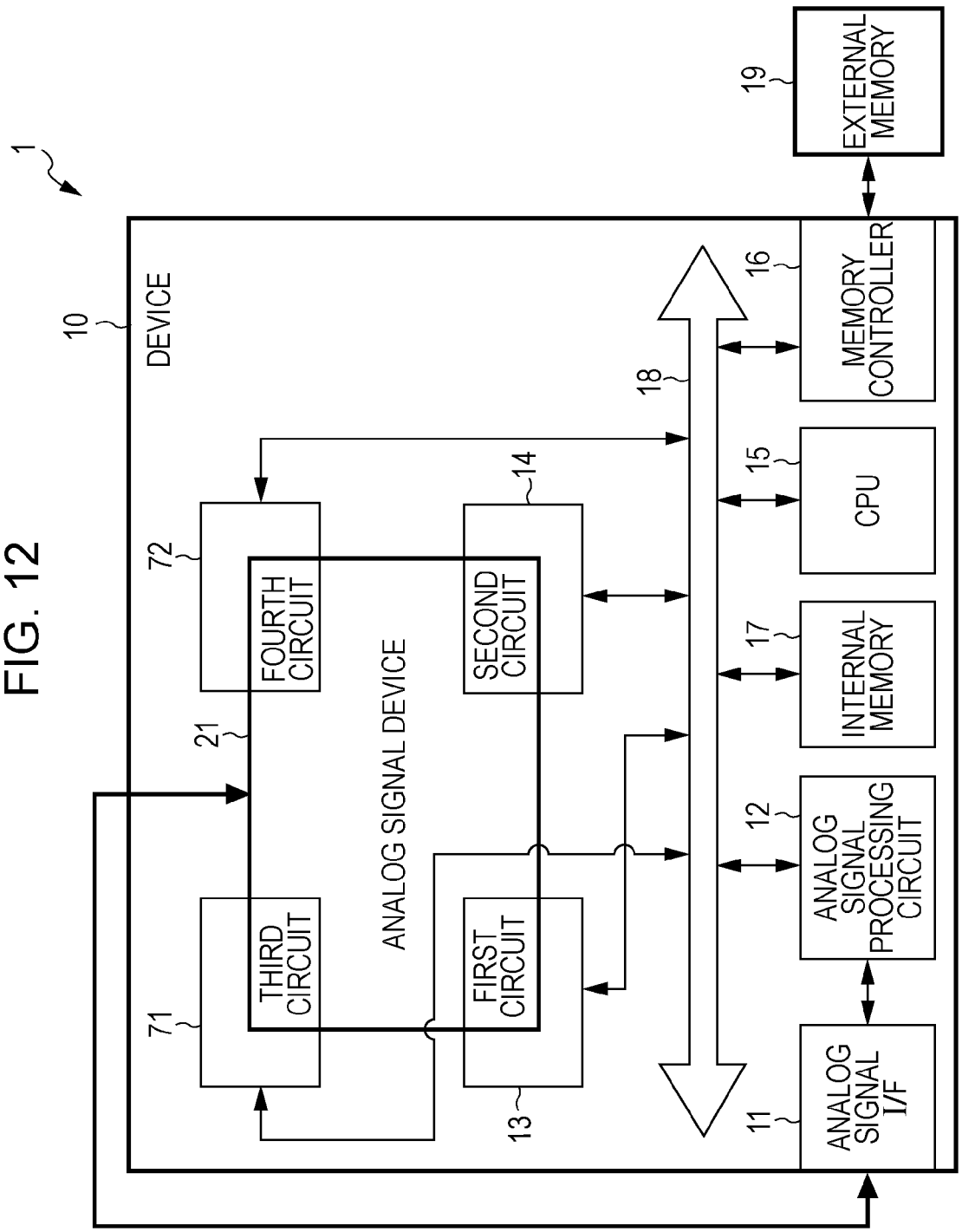
FIG. 12 is a third configuration example of a system to which a signal processing device has been applied according to the sixth embodiment of the present invention.

FIG. 12 is a third configuration example of a signal processing device according to the sixth embodiment of the present invention. Here, a device 10, an external memory 19, and an analog signal device 21 are in common with the second embodiment.

However, a difference is that the device 10 and the analog signal device 21 are arranged to overlap each other. The device 10 and the analog signal device 21 may overlap each other within the same package like SIP (System in Package).

The device 10 of FIG. 12 is different from that of the second embodiment in that a third circuit 71 and a fourth circuit 72 are provided. For example, the third circuit 71 or the fourth circuit 72 is a circuit for implementing the same function as that of a first circuit 13 or a second circuit 14.

In the layout of FIG. 12, the first circuit 13, the second circuit 14, the third circuit 71, and the fourth circuit 72 of the device 10 are laid out at positions overlapping four edges of the analog signal device 21.

In the layout of FIG. 12, the first circuit 13, the second circuit 14, the third circuit 71, and the fourth circuit 72 are laid out to be separated from one another so that they do not all fit into a range overlapping the analog signal device 21.

In the layout of FIG. 12, it may be expected that the first circuit 13, the second circuit 14, the third circuit 71, and the fourth circuit 72 influence the analog signal process.

In this case, the CPU 15 may change the strength of the noise cancelling process to the strong mode for only a partial analog signal processed at portions overlapping the first circuit 13 to the fourth circuit 72.

For example, when the analog signal device 21 is an image sensor circuit, the influence of the first circuit 13 to the fourth circuit 72 may be neglected in the system 1. The strength of the noise cancelling process may be changed by also determining an element other than the operation or stop of the first circuit 13 to the fourth circuit 72.

For example, the influence bias to the analog signal process is able to be suppressed by sequentially and equivalently using the first circuit 13 to the fourth circuit 72.

For example, as in the case where the analog signal device 21 is an image sensor circuit, the influence on the analog signal process may not be considered in the case where the first circuit 13 to the fourth circuit 72 are arranged so that the analog signal process is not substantially influenced.

As described above, in the device 10 of FIG. 10 of this embodiment, the first circuit 13 and the second circuit 14 are arranged and laid out along one side of the analog signal circuit 61 mounted on the same device 10.

Therefore, the analog signal circuit 61 is difficult to be influenced by the first circuit 13 and the second circuit 14.

In the device 10 of FIG. 11, the first circuit 13 and the second circuit 14 are laid out to be separated from each other so that they are arranged at positions diagonal to the analog signal circuit 61 in the same integrated circuit as that of the analog signal circuit 61.

Therefore, the analog signal circuit 61 is difficult to be influenced by the first circuit 13 and the second circuit 14.

In the analog signal device 21 and the other device 10, the first circuit 13 to the fourth circuit 72 of the system 1 of FIG. 12 are laid out to be separated from one another so that they do not all fit into the range overlapping the analog signal device 21.

Therefore, the separate analog signal device 21 is difficult to be influenced by the first circuit 13 to the fourth circuit 72.

7. Seventh Embodiment

[Description of Configuration]

Figure 13:
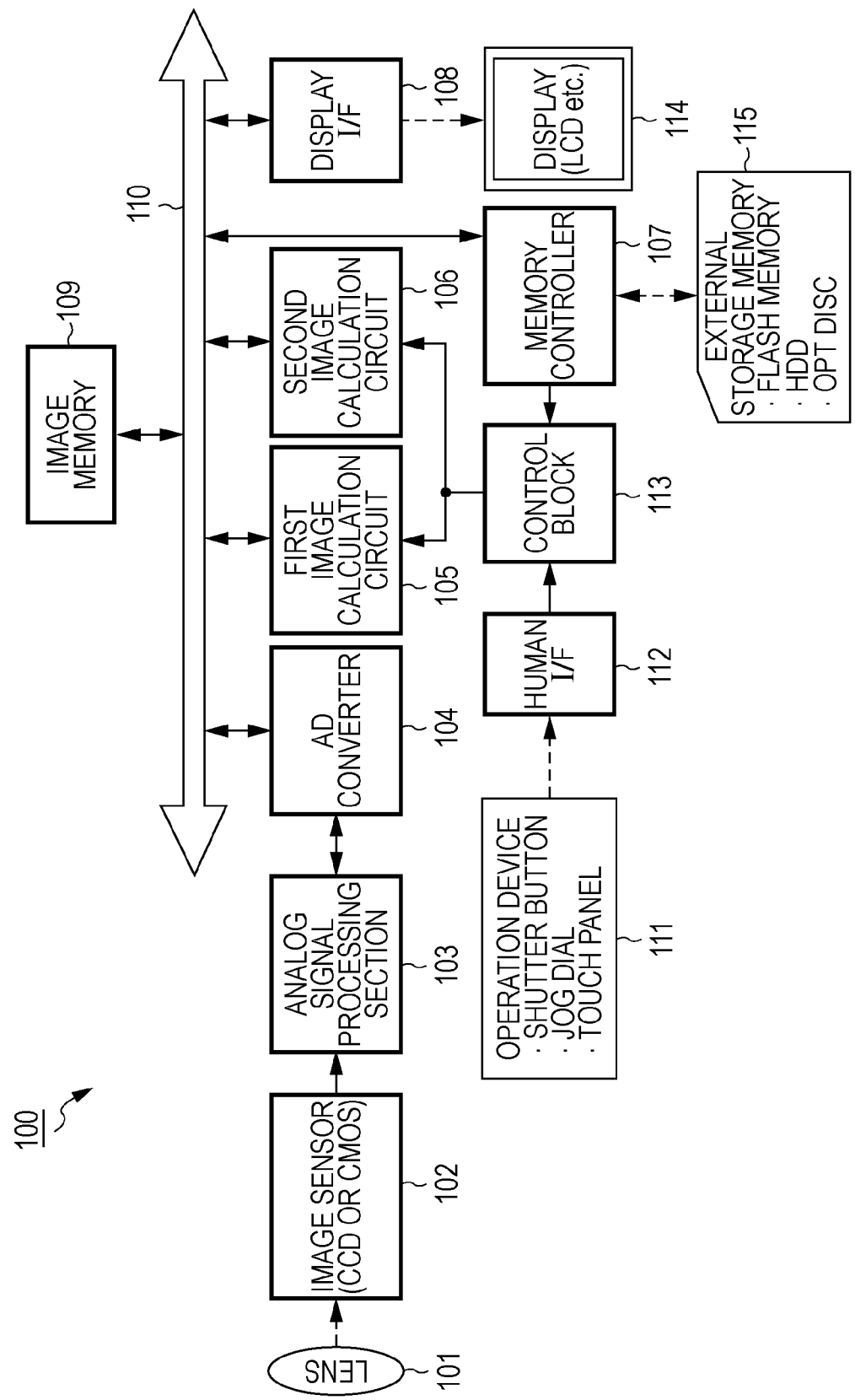
FIG. 13 is a configuration example of a camera system to which a signal processing device has been applied according to a seventh embodiment of the present invention.

FIG. 13 shows a configuration example of a camera system 100 to which a signal processing device has been applied according to the seventh embodiment of the present invention.

The camera system 100 has an AD converter 104, a first image calculation circuit 105, a second image calculation circuit 106, a memory controller 107, a display I/F 108, an image memory 109, and an internal bus 110.

The camera system 100 has a lens 101, an image sensor 102, an analog signal processing section 103, an operation device 111, a human I/F 112, a control block 113, and a display 114.

These elements 102 to 113 may be mounted on one device 10, or may be mounted on a plurality of devices 10 configuring one system 1.

The lens 101 condenses light.

For example, the image sensor 102 is an image sensor or a CCD or CMOS sensor having an image capturing element, and captures an image by the condensed light to convert the image into an analog image signal.

The analog signal processing section 103 executes a gamma correction process or the like for the analog image signal.

The AD converter 104 samples the processed analog image signal and converts the sampled signal into digital image data.

An external storage memory 115 such as a semiconductor memory, an HDD (Hard Disk Drive), an optical recording device, or the like is connected to the memory controller 107 so that the external storage memory 115 is attachable to or detachable from the memory controller 107.

The memory controller 107 stores the digital image data in the external storage memory 115.

The memory controller 107 reads the digital image data from the external storage memory 115.

For example, the memory controller 107 outputs information regarding an attaching or detaching operation to the control block 113 when the external storage memory 115 is attached or detached.

The image memory 109 temporarily stores the digital image data or the like.

The display 114 such as an LCD (Liquid Crystal Display) or the like is connected to the display I/F 108. The display 114 displays the image using the analog image signal.

The operation device 111 is connected to the human I/F 112. The operation device 111 has a shutter button, a dial, a touch panel, or the like, and outputs operating information to the control block 113.

The first image calculation circuit 105 and the second image calculation circuit 106 perform a process of compressing (encoding) digital image data, a decompressing (decoding) process, processing, or the like.

One or at least three image calculation circuits may be provided. The image calculation circuit may be a hardware circuit exclusively for a predetermined process, or a universal calculation circuit such as a CPU, a DSP, or the like may be made to execute a predetermined program.

The control block 113 has a control CPU, a power control section, a memory control section, and a clock block (not shown), and controls the first image calculation circuit 105, the second image calculation circuit 106, and the like.

[Description of Basic Operation of Camera]

In response to an operation of the operation device 111, the camera system 100 executes an operation of capturing a still image or a moving image, a storage operation to the external storage memory 115, an operation of reproducing an image stored in the external storage memory 115, or the like.

For example, when a photography button of the operation device 111 is operated, digital image data generated by the AD converter 104 is stored in the image memory 109.

During this process, the first image calculation circuit 105 and the second image calculation circuit 106 encode the digital image data stored in the image memory 109 on the basis of an instruction of the control block 113.

The encoded data is stored as a file in the external storage memory 115 by the memory controller 107.

In addition, for example, when a playback button of the operation device 111 is operated, the memory controller 107 reads digital image data from the external storage memory 115 and stores the data in the image memory 109.

During this process, the first image calculation circuit 105 and the second image calculation circuit 106 decode digital image data stored in the image memory 109 on the basis of an instruction of the control block 113, and further convert the data into image data having the desired number of pixels.

The converted image data is displayed on the display 114 by the display I/F 108.

In addition, for example, the first image calculation circuit 105 and the second image calculation circuit 106 are able to display the digital image data generated by the AD converter 104 on the display 114 by changing the number of pixels without encoding. In this case, an image captured by a lens is displayed on the display 114 in real time.

[Description of Operation]

As described above, the control block 113 controls processes of various camera functions requested by operations. In addition, the control block 113 executes a determination control process for suppressing the influence of a digital data process on an analog signal process.

To suppress the influence on the analog signal process, the control block 113 changes the operation state and the processing content (execution algorithm) of an internal circuit of the system 100.

For example, the operation state is the operating condition, the usage, the use frequency, or the like of the internal circuit of the camera system 100.

For example, when it is determined that the operating mode is the photography mode by acquiring information regarding the operating mode, the control block 113 determines that the influence on the analog signal process is present.

Thereafter, the control block 113 changes operating conditions and processing content of the first image calculation circuit 105 and the second image calculation circuit 106 so that the analog signal process for an image from the image sensor 102 to the AD converter 104 is not influenced.

In the layout of FIG. 13, the first image calculation circuit 105 is arranged to be closer to the AD converter 104 than the second image calculation circuit 106.

Therefore, when the photography button of the operation device 111 is operated, the control block 113 determines that the influence on the analog signal process for photography is present.

For example, the control block 113 lowers an operating voltage and a clock frequency of the first image calculation circuit 105, and raises an operating voltage and a clock frequency of the second image calculation circuit 106.

In addition, for example, when the number of pixels of a captured image is equal to or greater than a predetermined value, the control block 113 stops a process of encoding digital image data and executes a process of reducing the number of pixels only by the second image calculation circuit 106.

The quality of an analog signal of a captured image is able to be improved by the change control of the operating condition and the processing content.

Even in the photography mode, the change control content, the change level, or the like may be changed in response to a type of image (still image or moving image) to be captured, an image size, an image frame rate, or the like.

In the layout of FIG. 13, the second image calculation circuit 106 is arranged to be closer to the display I/F 108 than the first image calculation circuit 105.

Therefore, when the playback button of the operation device 111 has been operated, the control block 113 determines that the influence on the analog signal process for playback is present.

The control block 113 changes the operation states of the first image calculation circuit 105 and the second image calculation circuit 106 so that the analog signal process for a moving image from the display I/F 108 to the display 114 is not influenced.

The control block 113 may change the processing content of the first image calculation circuit 105 and the second image calculation circuit 106.

Specifically, the second image calculation circuit 106 is arranged to be closer to the display I/F 108 than the first image calculation circuit 105.

Therefore, for example, an operating voltage and a clock frequency of the second image calculation circuit 106 are lowered, and an operating voltage and a clock frequency of the first image calculation circuit 105 are raised.

By the change control of the operating condition or the processing content, the quality of an analog signal of a reproduction image is able to be improved.

Even in the playback mode, the change control content, the change level, or the like may be changed in response to a type of image (still image or moving image) to be reproduced, an image size, a moving image frame rate, or the like.

Figure 14:
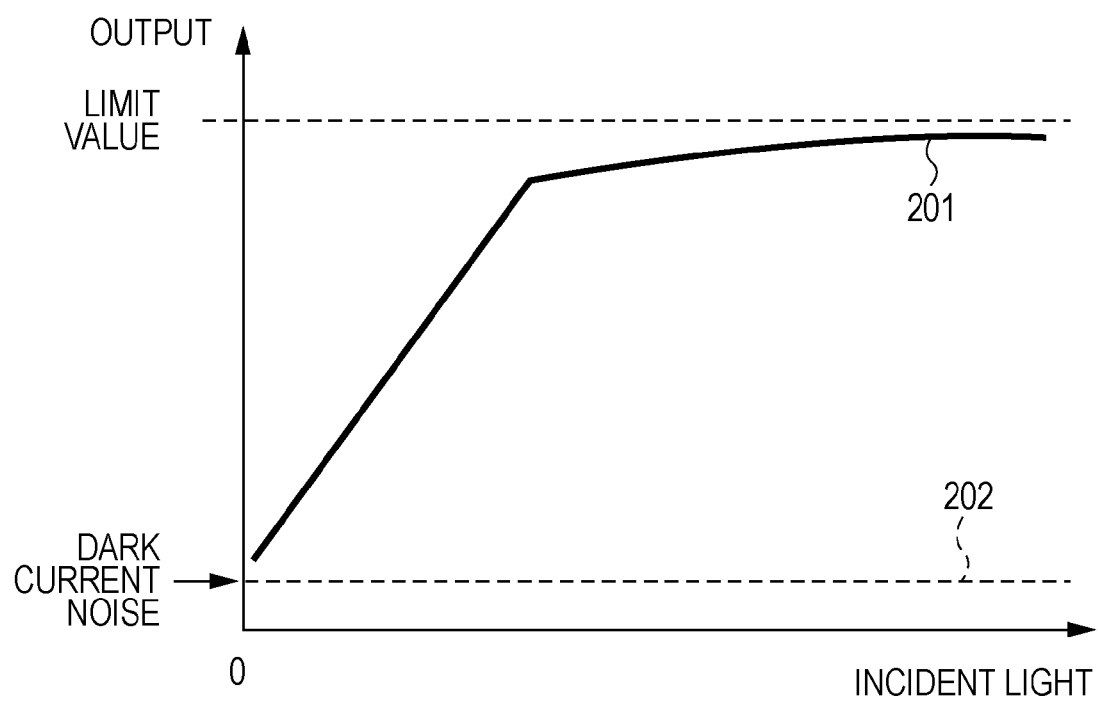
FIG. 14 is a diagram showing general dark output characteristics of a light receiving element.

In general, as shown in FIG. 14, the image sensor 102 (an image capturing element) of the camera system 100 outputs a low voltage even in a state in which incident light, that is, an input, has been shielded. Characteristics of the image sensor 102 are called dark output characteristics (dark voltage characteristics). A micro current called a dark current is also generated by the dark output characteristics.

FIG. 14 is an example of input/output characteristics of one light receiving element of the image sensor 102. The horizontal axis of FIG. 14 is the incident light quantity and the light quantity at the right side of the figure is large. The vertical axis is the output voltage and the voltage at the upper side of the figure is high.

In FIG. 14, an input/output characteristic line 201 and a dark output voltage (dark current noise level) 202 are shown.

As shown in FIG. 14, the sensitivity and the dynamic range of the image capturing element are limited by the dark output voltage 202.

A value of the dark output voltage 202 differs according to a light receiving element. The dark output voltage 202 varies according to a light receiving element even within one image sensor 102.

Accumulated charge noise varying according to a pixel by a dark current forms an uneven fixed pattern for each pixel in one image.

Therefore, it is difficult to remove a plurality of dark output voltages included in each pixel of one image (still image) by a uniform process. The sensitivity and the dynamic range of the image are limited by an image pattern fixed by the dark output voltage 202 which has not been removed.

In general, the dark current noise becomes twice as high when a temperature is raised by 7° C.

Therefore, an increase in the temperature of the image sensor 102 influences an analog signal of a captured image.

The temperature of the block of the image sensor 102 may be raised not only by power consumption by the image sensor 102, but also, for example, by power consumption by another internal circuit formed on the same semiconductor substrate or by heat generation of another circuit within the camera system 100.

For example, when the power is consumed and the temperature is raised by the signal variation of the internal bus 110, the activation level of the internal bus 110, the variation of a clock frequency, or the like, the analog signal process is influenced.

To suppress the influence on the analog signal process, for example, the noise generation in the analog signal or the processing circuits 102 to 104 may be actually measured in advance, and setting information based on the measurement result may be stored in a register within the control block 113 or the like.

For example, a table in which the actually measured noise is associated with the operation state of another element within the camera system 100 such as the internal bus 110, or a calculating expression is applicable as the setting information.

At the time of actual use, the control block 113 may acquire information indicating the operation state of another element within the camera system 100 such as the internal bus 110, and determine whether or not the influence exists by comparing the acquired information with the setting information. The control block 113 may perform change control corresponding to the determination result.

By the determination control, the control block 113 is able to suppress noise generated by an analog signal or its processing circuits (the image sensor 102 to the AD converter 104) due to the operation of another element within the camera system 100.

Figure 15:
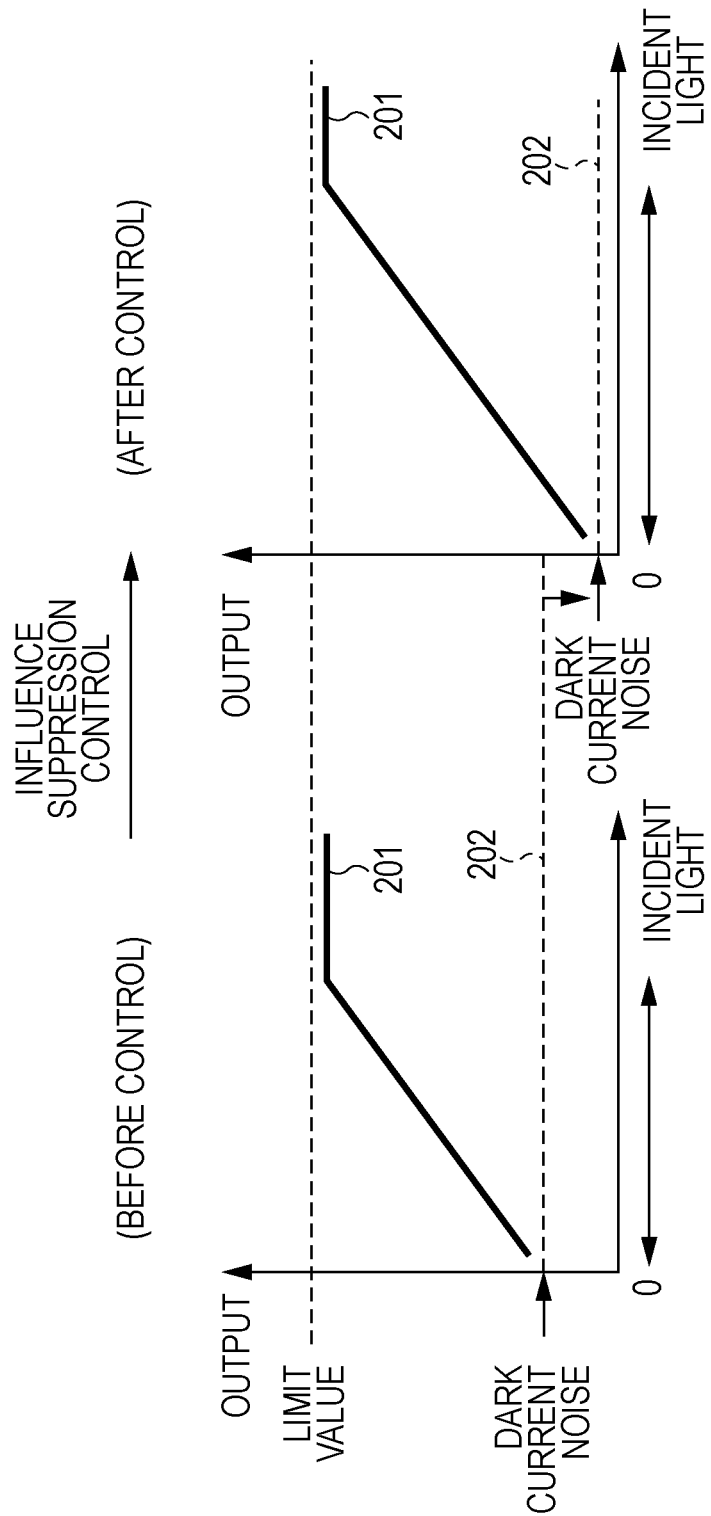
FIG. 15 is a diagram illustrating the effect of improving dark output characteristics by a control operation of suppressing the influence on an analog signal process.

By the determination control, the control block 113 is able to improve the dark current characteristics as shown in FIG. 15.

FIG. 15 is an example of input/output characteristics of a light receiving element before and after the influence on the analog signal process is controlled to be suppressed. The left side of FIG. 15 is the input/output characteristics before control and the right side is the input/output characteristics after control.

Consequently, as advantages of this embodiment, the dynamic range is able to be maintained and enlarged by increasing the sensitivity of the image capturing element, and the image quality is able to be further improved.

As seen from the input/output characteristics of FIGS. 14 and 15, the dark current noise is able to be measured as an output of the image capturing element when the incident light of the image capturing element has been set to 0.

Likewise, in the case where output noise is generated when an input has been set to 0 even in the analog sensor other than the image capturing element, the influence on the analog signal process is able to be controlled by the above-described determination control, and the quality of the analog signal is able to be improved.

In the camera system 100, the determination method and the control method described in the other embodiments may be adopted to suppress the influence of the digital data process on the analog signal process.

8. Eighth Embodiment

[Description of Configuration]

Figure 16:
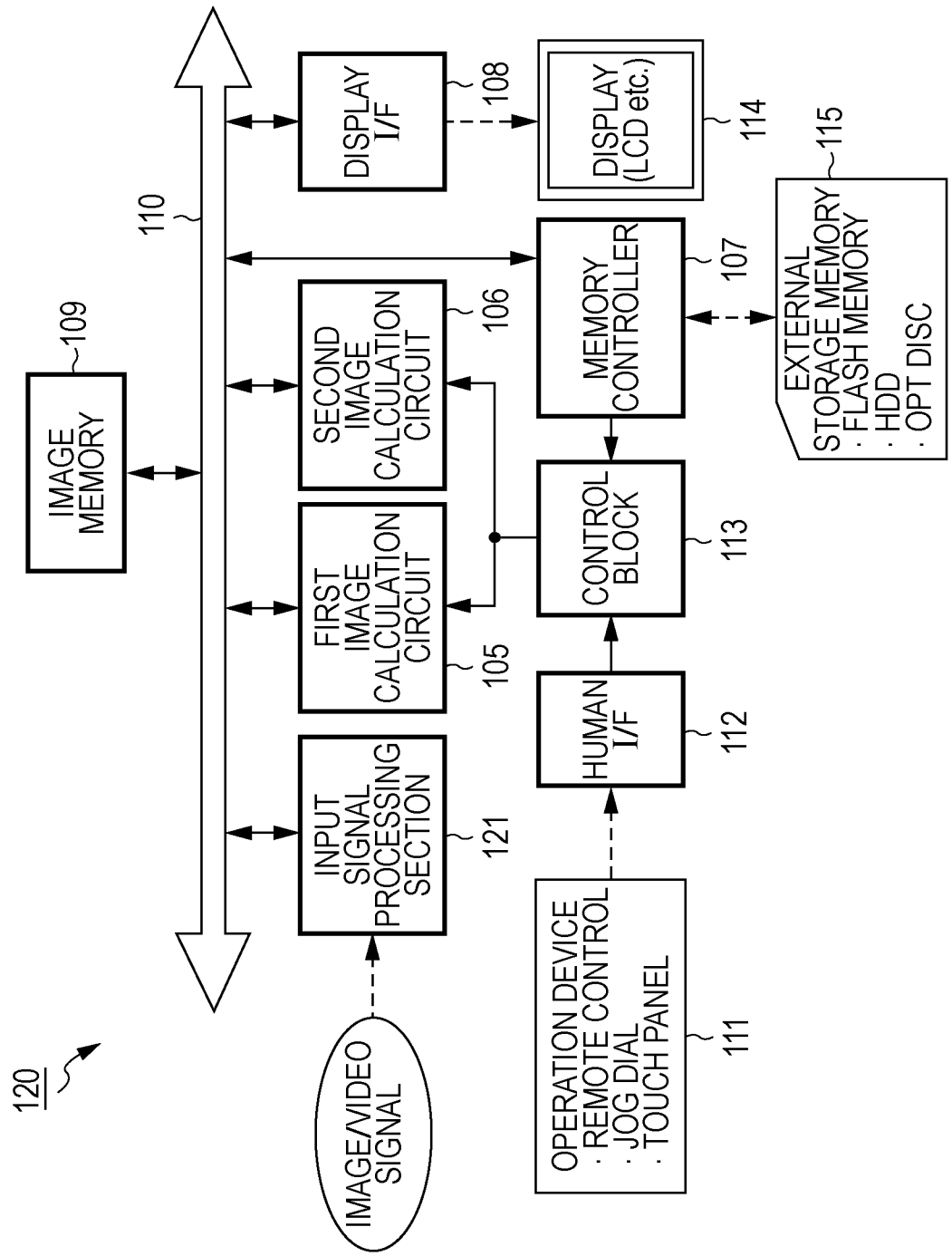
FIG. 16 is a configuration example of an image recording/reproducing system to which a signal processing device has been applied according to an eighth embodiment of the present invention.

FIG. 16 shows a configuration example of an image recording/reproducing system 120 to which a signal processing device has been applied according to the eighth embodiment of the present invention. For example, the image recording/reproducing system 120 is a television or a recorder.

Here, a first image calculation circuit 105, a second image calculation circuit 106, a memory controller 107, a display I/F 108, an image memory 109, and an internal bus 110 are in common with the seventh embodiment.

An operation device 111, a human I/F 112, a control block 113, a display 114, and an external storage memory 115 are in common with the seventh embodiment.

However, a difference is that an input signal processing section 121 is provided.

Elements 105 to 113 and 121 may be mounted on one device 10 or may be mounted on a plurality of devices 10 configuring one system 1.

The number of image calculation circuits such as the first image calculation circuit 105 and the second image calculation circuit 106 may be one or at least three.

For example, the input signal processing section 121 has an antenna, a tuner, or a signal receiving circuit, and receives an analog radio wave or an analog signal.

For example, the input signal processing section 121 converts the input analog radio wave or analog signal into digital data having a format capable of being processed by the image calculation circuit.

In addition, for example, the input signal processing section 121 may separate and demodulate digital data superimposed on the input radio wave or analog signal.

When the analog radio wave or analog signal is input, the input signal processing section 121 also perform a function of an AD converter.

[Basic Operation of Recording/Reproducing Image]

The image recording/reproducing system 120 executes a process for a predetermined function under control of the control block 113 corresponding to an operation of the operation device 111 or the like.

For example, the image recording/reproducing system 120 stores an input analog image signal or image signal in an external storage memory 115 or reproduces an analog image stored in the external storage memory 115.

In addition, for example, the image recording/reproducing system 120 is able to reproduce and display the input image signal or image signal on a display without storing the signal in the external storage memory 115.

To implement these functions, digital image data is temporarily stored in the image memory 109, and a process corresponding to an implementation function is performed by the first image calculation circuit 105 and the second image calculation circuit 106.

For example, the first image calculation circuit 105 and the second image calculation circuit 106 execute an encoding process, a decoding process, a resolution conversion process, a frame rate conversion process, or the like.

For example, the resolution or the frame rate of a still image or a moving image is able to be converted and stored or displayed. A quantity of data to be stored as a file in the external storage memory 115 is able to be reduced by lowering and storing the resolution or the frame rate.

[Description of Operation]

The control block 113 controls a process for a function of displaying/recording an image described above.

In addition, the control block 113 executes a determination process for suppressing the influence on an analog signal process. The control block 113 changes the operation state and the processing content of an internal circuit of the image recording/reproducing system 120 in response to the determination result.

For example, upon recording or reception, the control block 113 changes operating conditions and processing content elements of the first image calculation circuit 105 and the second image calculation circuit 106 so that an analog signal process of the input signal processing section 121 is not influenced.

For example, the processing content elements capable of being changed are usages, use frequencies, and execution algorithms of the first image calculation circuit 105 and the second image calculation circuit 106.

Under the change control, the image recording/reproducing system 120 is able to improve the quality of a captured image by suppressing the influence of a digital data process on an analog signal process in the input signal processing section 121.

The control block 113 may change the change control content, the change level, or the like in response to a type of image (still image or moving image) to be captured, an image size, an image frame rate, or the like without performing uniform determination control in the recording mode.

Upon reproduction, the control block 113 changes the operating conditions and the processing content elements of the first image calculation circuit 105 and the second image calculation circuit 106 so that an analog signal to the display 114 is not influenced.

For example, the processing content elements capable of being changed are usages, use frequencies, and execution algorithms of the first image calculation circuit 105 and the second image calculation circuit 106.

As an advantage of this embodiment, the quality of a reproduction image is able to be improved by suppressing the influence of a digital data process on an analog signal process in the display I/F 108.

The control block 113 may change the change control content, the change level, or the like in response to a type of image (still image or moving image) to be reproduced, an image size, an image frame rate, or the like without performing uniform determination control in the playback mode.

In the image recording/reproducing system 120, the determination method and the control method described in the other embodiments may be adopted to suppress the influence of the digital data process on the analog signal process.

As described above, the analog signal processing circuit 12, the analog signal device 21, and the analog signal circuit 61 of the embodiments described above are difficult to be influenced by the digital data processing circuit.

In each embodiment described above, an analog signal process with small noise is possible.

In each embodiment described above, it is possible to manufacture a more compact signal processing system by densely laying out blocks.

In each embodiment described above, it is possible to manufacture an image recording/reproducing device, a camera device, or the like having low power consumption at high performance.

In each embodiment described above, it is possible to manufacture a high-performance image capturing device, a high-performance wireless transmission/reception device, a high-performance parallel processor system, or the like.

The method in detail described in each embodiment is formed as a program corresponding to the above-described procedure, and is executed by a computer such as a CPU or the like.

In addition, for example, a program of each method may be recorded in a computer-readable recording medium such as a semiconductor memory, a magnetic disk, an optical disk, a floppy (registered trademark) disk, or the like. It may be configured that a set computer accesses the recording medium and executes the above-described program.

The present application contains subject matter related to that disclosed in Japanese Priority Patent Application JP 2008-334989 filed in the Japan Patent Office on Dec. 26, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing device comprising:
an analog signal processing circuit;
a digital data processing circuit;
a determination section configured to determine an influence of the digital data processing circuit on the analog signal processing circuit; and
a control section configured to stop a partial circuit of the digital data processing circuit or lower processing capability thereof in response to a determination result of the determination section;
wherein the digital data processing circuit includes a plurality of data processing circuits configured to perform data processes independent of each other,
wherein the determination section determines an influence of each data processing circuit on the analog signal processing circuit,
wherein the control section stops a partial data processing circuit of the plurality of data processing circuits and a data processing circuit determined to influence the analog signal processing circuit or lowers processing capability thereof, and
wherein the determination section is adapted to:
obtain an influence level of each data processing circuit by acquiring state information of each data processing circuit;
acquire state information of the analog signal processing circuit;
obtain an influence level corresponding to a state of the signal processing device by acquiring state information of the signal processing device;
obtain an influence level of the entire digital data processing circuit on the analog signal processing circuit using the influence level corresponding to the state of the signal processing device, the influence level of each data processing circuit, and the state information of the analog signal processing circuit; and
determine that the digital data processing circuit has an influence when the influence level of the entire analog signal processing circuit exceeds a limit value.

2. The signal processing device according to claim 1, wherein the plurality of data processing circuits are capable of executing a common data process and arranged at different distances from the analog signal processing circuit on the same integrated circuit as the analog signal processing circuit, and
wherein the determination section determines that a data processing circuit arranged close to the analog signal processing circuit among the plurality of data processing circuits influences the analog signal processing circuit.

3. The signal processing device according to claim 1, wherein the control section raises processing capability of a remaining data processing circuit which has not been stopped or of which the processing capability has not been lowered.

4. The signal processing device according to claim 1, wherein the determination section is adapted to:

determine an execution state of an analog signal process; and prevent an influence determination from being made when no analog signal process is executed.

5. The signal processing device according to claim 4, wherein the determination section is adapted to:
acquire state information of the digital data processing circuit; and
determine an influence of each data processing circuit on the analog signal processing circuit by determining whether or not the data processing circuit available in an operation state indicated by the state information influences the analog signal processing circuit using setting information.

6. The signal processing device according to claim 1, wherein the analog signal processing circuit, the digital data processing circuit, the determination section, and the control section are implemented in one integrated circuit.

7. The signal processing device according to claim 1, wherein the analog signal processing circuit, the digital data processing circuit, the determination section, and the control section are implemented in a plurality of integrated circuits.

8. The signal processing device according to claim 1, wherein the control section performs at least one control selected from among power supply stop control, voltage reduction control, operating speed reduction control, and use frequency limit control for a partial circuit of the digital data processing circuit serving as a control target.

9. The signal processing device according to claim 1, wherein the control section changes control content for a partial circuit of the digital data processing circuit serving as a control target step by step in response to a result of the determination of the determination section.

10. The signal processing device according to claim 1, further comprising:
an analog circuit connected to the analog signal processing circuit;
wherein the determination section determines an influence on the analog signal processing circuit and determines an influence on the analog circuit.

11. The signal processing device according to claim 10, wherein the digital data processing circuit includes a plurality of data processing circuits capable of executing data processes independent of each other,
wherein the plurality of data processing circuits are laid out along one side of a block of the analog circuit in the same integrated circuit as that of the analog circuit.

12. The signal processing device according to claim 10, wherein the digital data processing circuit includes a plurality of data processing circuits capable of executing data processes independent of each other,
wherein the plurality of data processing circuits are laid out to be separated from each other so that each data processing circuit is arranged at a position diagonal to the analog circuit in the same integrated circuit as that of the analog circuit.

13. The signal processing device according to claim 10, wherein the digital data processing circuit includes a plurality of data processing circuits capable of executing data processes independent of each other,
wherein the plurality of data processing circuits are laid out to be separated from each other so that all the plurality of data processing circuits do not fit into a range overlapping the analog circuit in another integrated circuit overlapping an integrated circuit of the analog circuit.

14. A signal processing device comprising:
an analog signal processing circuit;
a digital data processing circuit;
a determination section configured to determine an influence of the digital data processing circuit on the analog signal processing circuit; and
a control section configured to stop a partial circuit of the digital data processing circuit or lower processing capability thereof in response to a determination result of the determination section;
wherein the digital data processing circuit includes a plurality of data processing circuits configured to perform data processes independent of each other,
wherein the determination section determines an influence of each data processing circuit on the analog signal processing circuit,
wherein the control section stops a partial data processing circuit of the plurality of data processing circuits and a data processing circuit determined to influence the analog signal processing circuit or lowers processing capability thereof,
wherein the determination section is adapted to:
obtain an influence level of each data processing circuit by acquiring state information of each data processing circuit;
acquire state information of the analog signal processing circuit;
obtain an influence level corresponding to a state of the signal processing device by acquiring state information of the signal processing device;
obtain an influence level of the entire digital data processing circuit on the analog signal processing circuit using the influence level corresponding to the state of the signal processing device, the influence level of each data processing circuit, and the state information of the analog signal processing circuit; and
determine that the digital data processing circuit has an influence when the influence level of the entire analog signal processing circuit exceeds a limit value,
wherein the signal processing device further comprises an analog circuit connected to the analog signal processing circuit, wherein the analog circuit includes a plurality of image capturing elements and outputs analog signals of images captured by the plurality of image capturing elements to the analog signal processing circuit, and
wherein the determination section further determines an influence of the digital processing circuit on the analog circuit by determining an influence on dark output characteristics of the plurality of image capturing elements.

* * * * *